(12) United States Patent
Tsutsui et al.

(10) Patent No.: US 6,303,713 B1
(45) Date of Patent: Oct. 16, 2001

(54) GRAFT MODIFIED ETHYLENE α-OLEFIN COPOLYMER OBTAINED BY GRAFT COPOLYMERZING AN ETHYLENE/α-OLEFIN COPOLYMER WITH A POLAR MONOMER

(75) Inventors: Toshiyuki Tsutsui; Ken Yoshitsugu; Mamoru Takahashi; Akira Todo; Seiji Ohta; Hajime Inagaki, all of Waki-cho (JP)

(73) Assignee: Mitsui Chemicals INC, Tokyo (JP)

( * ) Notice: Subject to any disclaimer, the term of this patent is extended or adjusted under 35 U.S.C. 154(b) by 0 days.

(21) Appl. No.: 09/377,918

(22) Filed: Aug. 20, 1999

Related U.S. Application Data

(62) Division of application No. 08/461,948, filed on Jun. 5, 1995, now Pat. No. 6,001,941, which is a division of application No. 08/154,462, filed on Nov. 18, 1993, now abandoned.

(51) Int. Cl.[7] .................................................. C08F 4/44

(52) U.S. Cl. .................. 526/114; 526/227; 526/348.2; 526/348.5; 526/348.6

(58) Field of Search .............................. 526/227, 348.2, 526/348.5, 348.6, 114

(56) References Cited

U.S. PATENT DOCUMENTS

| | | | |
|---|---|---|---|
| 4,506,056 | * 3/1985 | Gaylord | 524/445 |
| 4,530,914 | 7/1985 | Ewen et al. . | |
| 4,937,299 | 6/1990 | Ewen et al. . | |
| 5,308,816 | 5/1994 | Tsutsui et al. . | |
| 5,464,905 | * 11/1995 | Tsutsui et al. | 525/240 |

FOREIGN PATENT DOCUMENTS

| | | |
|---|---|---|
| 1231701 | 1/1988 | (CA) . |
| 1231702 | 1/1988 | (CA) . |
| 2040713 | 10/1991 | (CA) . |
| 2103379 | 5/1994 | (CA) . |
| 2103380 | 5/1994 | (CA) . |

(List continued on next page.)

OTHER PUBLICATIONS

Database WPI Derwent Pub. Ltd. London, GB; AN 92–099902 'high impact strength PE resin compsn' & JPA 04 041 537 (Showa Denko Kabushiki Kaisha).

Database WPI Derwent Pub. Ltd. London, GB; Section Ch, Week 7905, AN 79–09013B & JP 53 145 856 (Furukawa Electric Co.).

Database WPI, Derwent Pub. Ltd., London, GB; Section Ch, Week 8908, AN 89–057340 & JP 01 009 255 A (Mitsui Petrochem Ind KK).

Database WPI, Derwent Pub. Ltd., London, GB; Section Ch, Week 9122, AN 91–160014 & JP 03 095 243 (Mitsui Petrochem Ind KK).

(List continued on next page.)

*Primary Examiner*—David W. Wu
*Assistant Examiner*—William Cheung

(57) ABSTRACT

A graft modified ethylene/α-olefin copolymer obtained by graft polymerizing an ethylene/α-olefin of 3 to 20 carbon atoms copolymerizing with a polar monomer in the presence of a catalyst for olefin polymerization comprising an organoaluminum oxy-compound (a) and at least two kinds of transition metal compounds (b). This ethylene/α-olefin copolymer has high melt tension and high flowability. An ethylene copolymer composition comprising the above-mentioned graft modified ethylene/α-olefin copolymer and polyolefin. The graft modified ethylene/α-olefin copolymer of the invention is excellent in heat stability and moldability. From this copolymer, a film having a high transparency and good adhesion to highly polar materials can be produced. The ethylene copolymer composition of the invention is excellent in heat stability and moldability. From this composition, a film having high transparency and good adhesion to highly polar materials can be produced.

9 Claims, 4 Drawing Sheets

FOREIGN PATENT DOCUMENTS

| | | |
|---|---|---|
| 1333826 | 1/1995 | (CA). |
| 0090418 | 10/1983 | (EP). |
| 0128046 | 12/1984 | (EP). |
| 0230344 | 7/1987 | (EP). |
| 0268294 | 5/1988 | (EP). |
| 0298294 | 5/1988 | (EP). |
| 0452920 | 10/1991 | (EP). |
| 0495099 | 7/1992 | (EP). |
| 0495996 | 7/1992 | (EP). |
| 0508415 | 10/1992 | (EP). |

OTHER PUBLICATIONS

Patent Abstracts of Japan vol. 16, No. 528 (C–1001) Oct. 29, 1992 & JPA 90 322 199 (Mitsui Petrochemical Industries) Jul. 17, 1992.

Database WPI Derwent Publications Ltd., London, GB; An 92–099902 'high impact strength PE resin compsn' & JPA 4 041 537 (Showa Denko Kabushiki Kaisha).

* cited by examiner

○ : Copolymer of the present invention (Ex. 7~Ex. 10)
□ : Conventional copolymer (Comp. Ex. 1)
△ : Conventional copolymer (Comp. Ex. 2~Comp. Ex. 4)

GRAFT MODIFIED ETHYLENE α-OLEFIN COPOLYMER OBTAINED BY GRAFT COPOLYMERZING AN ETHYLENE/α-OLEFIN COPOLYMER WITH A POLAR MONOMER

This application is a division of application Ser. No. 08/461,948 filed Jun. 5, 1995 U.S. Pat. No. 6,001,941 which is a division of application Ser. No. 08/154,462 filed Nov. 18, 1993 abandoned to which applicants claim priority.

The application Ser. No. 08/461,948 issued as U.S. Pat. No. 6,001,941 on Dec. 14, 1999. The application Ser. No. 154,462 was abandoned in favor of continuation application Ser. No. 618,109, filed Mar. 19, 1996 U.S. Pat. No. 5,703,180, which issued as U.S. Pat. No. 5,703,180 on Dec. 30, 1997.

FIELD OF THE INVENTION

The present invention relates to a catalyst for olefin polymerization, a process for olefin polymerization using said catalyst, an ethylene/α-olefin copolymer, a graft modified ethylene/α-olefin copolymer and an ethylene copolymer composition. More particularly, the invention relates to a catalyst for olefin polymerization which is capable for producing an olefin polymer excellent in transparency, mechanical strength and moldability, to a process for olefin polymerization using said catalyst, to an ethylene/α-olefin copolymer of high moldability which is capable for giving a film having higher transparency and mechanical strength as compared with films obtained from conventionally known ethylene copolymers, and to a graft modified ethylene/α-olefin copolymer and an ethylene copolymer composition both having high moldability and high adhesion strength to metals or polar resins and from which a film having higher transparency and mechanical strength as compared with films obtained from conventionally known ethylene copolymers or ethylene copolymer compositions can be produced.

BACKGROUND OF THE INVENTION

Ethylene copolymers have heretofore been molded by various molding methods, and used in many fields. The requirement for the characteristics of the ethylene copolymers differs depending on the molding methods and uses. For example, when an inflation film is molded at a high speed, it is necessary to select an ethylene copolymer having a high melt tension compared with its molecular weight in order to stably conduct high speed molding without fluctuation or tearing of bubbles. An ethylene copolymer is required to have similar characteristics in order to prevent sag or tearing in blow molding, or to suppress width shortage to the minimum range in T-die molding.

By the way, Japanese Patent L-O-P Nos. 90810/1981 and 106806/1985 propose a method for improving moldability by improving the melt tension and die swell ratio of ethylene polymers obtained by using Ziegler type catalysts, especially a titanium type catalyst.

The ethylene polymers obtained by using a titanium catalyst, however, especially the low density ethylene polymers generally have problems such as their broad composition distribution and stickiness of their molded articles such as films.

Of the ethylene polymers prepared by using the Ziegler type catalysts, those obtained by using chromium type catalysts are relatively excellent in melt tension but has a defect of poor heat stability. This is thought to be caused by that the chain terminals of the ethylene polymers prepared by using the chromium type catalysts tend to become unsaturated bonds.

It is known that the ethylene polymers obtained by using a metallocene catalyst from among the Ziegler type catalysts have merits such as a narrow composition distribution and a low stickiness of their molded articles such as films. However, it is described in, for example Japanese Patent L-O-P. No. 35007/1985, that an ethylene polymer obtained by using a zirconocene compound formed from a cyclopentadienyl derivative contains one terminal unsaturated bond per molecule, and hence this ethylene polymer is presumably poor in heat stability similarly to the above-mentioned ethylene polymer obtained by using the chromium type catalyst.

Accordingly, it will industrially be of great value to provide a catalyst for olefin polymerization or a process for olefin polymerization, by which an olefin copolymer, particularly an ethylene copolymer, having good heat stability, high mechanical strength and a narrow composition distribution can be prepared.

By the way, ethylene copolymers generally have no polar group in the molecule and inherently non-polar, so that they are insufficient in adhesion strength to highly polar materials such as metals and polar resins. For these reasons, when such ethylene copolymers are used by bonding them with the highly polar materials, it is necessary to subject the surface of the ethylene copolymer to a flame treatment, a corona discharge treatment, a primer treatment or the like, and hence resulting in a problem of complicated operation.

Accordingly, it will also industrially be of great value to provide an ethylene copolymer or an ethylene copolymer composition, which has high melt tension, good heat stability and high mechanical strength and shows sufficient adhesion strength to highly polar materials.

OBJECT OF THE INVENTION

It is, therefore, an object of the present invention to provide a catalyst for olefin polymerization which is capable for producing an olefin polymer excellent in transparency, mechanical strength and moldability, and to provide a process for olefin polymerization using said catalyst. It is another object of the invention to provide an ethylene/α-olefin copolymer of good moldability which is capable for giving a film having higher transparency and mechanical strength as compared with films obtained from conventionally known ethylene copolymers, and to provide a graft modified ethylene/α-olefin copolymer and an ethylene copolymer composition both having good moldability and high adhesion strength to metals or polar resins and from which a film having higher transparency and mechanical strength as compared with films obtained from conventionally known ethylene copolymers or ethylene copolymer compositions can be produced.

SUMMARY OF THE INVENTION

The first catalyst for olefin polymerization according to the present invention is a catalyst for olefin polymerization, comprising:

(a) an organoaluminum oxy-compound,
(b-I) at least one kind of a transition metal compound represented by the following formula [I]:

$$ML^1_x \qquad [I]$$

wherein M is a transition metal atom selected from Group IVB of the periodic table, $L^1$ is a ligand coordinating to the transition metal atom M, at least two of $L^1$ are groups selected from a cyclopentadienyl group, a methylcyclopentadienyl group, an ethylcyclopentadienyl group and a substituted cyclopentadienyl group having at least one substituent group selected from a hydrocarbon group of 3 to 10 carbon atoms, $L^1$ other than the (substituted) cyclopentadienyl group is a hydrocarbon group of 1 to 12 carbon atoms, an alkoxy group, an aryloxy group, a trialkylsilyl group, a halogen atom or a hydrogen atom, and X is a valence of the transition metal atom M, and (b-II) at least one kind of a transition metal compound represented by the following formula [II]:

$$ML^2{}_X \qquad [II]$$

wherein M is a transition metal atom selected from Group IVB of the periodic table, $L^2$ is a ligand coordinating to the transition metal atom, at least two of $L^2$ are substituted cyclopentadienyl groups having 2–5 substituent groups selected from a methyl group and an ethyl group, $L^2$ other than the substituted cyclopentadienyl group is a hydrocarbon group of 1 to 12 carbon atoms, an alkoxy group, an aryloxy group, a trialkylsilyl group, a halogen atom or a hydrogen atom, and X is a valence of the transition metal atom M.

The second catalyst for olefin polymerization according to the present invention is a catalyst for olefin polymerization, comprising:

(a) an organoaluminum oxy-compound,
(b-I) at least one kind of a transition metal compound represented by the above formula [I],
(b-II) at least one kind of a transition metal compound represented by the above formula [II], and
(c) an organoaluminum compound.

The third catalyst for olefin polymerization according to the present invention is a catalyst for olefin polymerization, comprising:

a carrier,
(a) an organoaluminum oxy-compound,
(b-I) at least one kind of a transition metal compound represented by the above formula [I], and
(b-II) at least one kind of a transition metal compound represented by the above formula [II],
said organoaluminum oxy-compound (a), said transition metal compound (b-I) and said transition metal compound (b-II) being supported on the carrier.

The fourth catalyst for olefin polymerization according to the present invention is a catalyst for olefin polymerization, comprising:

a solid catalyst component comprising:
a carrier,
(a) an organoaluminum oxy-compound,
(b-I) at least one kind of a transition metal compound represented by the above formula [I], and
(b-II) at least one kind of a transition metal compound represented by the above formula [II],
said organoaluminum oxy-compound (a), said transition metal compound (b-I) and said transition metal compound (b-II) being supported on the carrier; and
(d) an organoaluminum compound.

The fifth catalyst for olefin polymerization according to the present invention is a catalyst for olefin polymerization, comprising:

a carrier,
(a) an organoaluminum oxy-compound,
(b-I) at least one kind of a transition metal compound represented by the above formula [I],
(b-II) at least one kind of a transition metal compound represented by the above formula [II], and
(c) an organoaluminum compound,
said organoaluminum oxy-compound (a), said transition metal compound (b-I), said transition metal compound (b-II) and said organoaluminum compound (c) being supported on the carrier.

The sixth catalyst for olefin polymerization according to the present invention is a catalyst for olefin polymerization, comprising:

a solid catalyst component comprising:
a carrier,
(a) an organoaluminum oxy-compound,
(b-I) at least one kind of a transition metal compound represented by the above formula [I],
(b-II) at least one kind of a transition metal compound represented by the above formula [II], and
(c) an organoaluminum compound,
said organoaluminum oxy-compound (a), said transition metal compound (b-I), said transition metal compound (b-II) and said organoaluminum compound (c) being supported on the carrier; and
(d) an organoaluminum compound.

The seventh catalyst for olefin polymerization according to the present invention is a catalyst for olefin polymerization obtained by prepolymerizing an olefin on a solid catalyst component, said solid catalyst component comprising:

a carrier,
(a) an organoaluminum oxy-compound,
(b-I) at least one kind of a transition metal compound represented by the above formula [I], and
(b-II) at least one kind of a transition metal compound represented by the above formula [II],
said organoaluminum oxy-compound (a), said transition metal compound (b-I) and said transition metal compound (b-II) being supported on the carrier.

The eighth catalyst for olefin polymerization according to the present invention is a catalyst for olefin polymerization, comprising:

a prepolymerized catalyst component obtained by prepolymerizing an olefin on a solid catalyst component, said solid catalyst component comprising:
a carrier,
(a) an organoaluminum oxy-compound,
(b-I) at least one kind of a transition metal compound represented by the above formula [I], and
(b-II) at least one kind of a transition metal compound represented by the above formula [II],
said organoaluminum oxy-compound (a), said transition metal compound (b-I) and said transition metal compound (b-II) being supported on the carrier; and
(d) an organoaluminum compound.

The ninth catalyst for olefin polymerization according to the present invention is a catalyst for olefin polymerization obtained by prepolymerizing an olefin on a solid catalyst component, said solid catalyst component comprising:

a carrier,
(a) an organoaluminum oxy-compound,
(b-I) at least one kind of a transition metal compound represented by the above formula [I], (b-II) at least one kind of a transition metal compound represented by the above formula [II], and (c) an organoaluminum compound, said organoaluminum oxy-compound (a), said transition metal compound (b-I), said transition metal compound (b-II) and said organoaluminum compound (c) being supported on the carrier.

The tenth catalyst for olefin polymerization according to the present invention is a catalyst for olefin polymerization, comprising:

a prepolymerized catalyst component obtained by prepolymerizing an olefin on a solid catalyst component, said solid catalyst component comprising:

a carrier, (a) an organoaluminum oxy-compound, (b-I) at least one kind of a transition metal compound represented by the above formula [I], (b-II) at least one kind of a transition metal compound represented by the above formula [II], and (c) an organoaluminum compound, said organoaluminum oxy-compound (a), said transition metal compound (b-I), said transition metal compound (b-II) and said organoaluminum compound (c) being supported on the carrier; and (d) an organoaluminum compound.

The process for olefin polymerization according to the present invention is characterized in that an olefin is polymerized in the presence of any of the above-mentioned catalysts for olefin polymerization.

By the use of these catalysts for olefin polymerization or the processes using these catalysts, an olefin polymer excellent in moldability, transparency and mechanical strength can be prepared.

The first ethylene/α-olefin copolymer according to the present invention is an ethylene/α-olefin copolymer obtained by copolymerizing ethylene with an α-olefin of 3 to 20 carbon atoms in the presence of a catalyst for olefin polymerization comprising (a) an organoaluminum oxy-compound and (b) at least two kinds of compounds of Group IV transition metals of the periodic table containing a ligand having a cyclopentadienyl skeleton, wherein the ethylene/α-olefin copolymer has such properties that:

(i) the density is in the range of 0.850 to 0.980 g/cm$^3$, (ii) the melt flow rate (MFR) at 190° C. under a load of 2.16 kg is in the range of 0.01 to 200 g/10 min, (iii) the melt tension (MT (g)) at 190° C. and the melt flow rate (MFR) satisfy the relation
MT>2.2×MFR$^{-0.84}$, and (iv) the flow index (FI (1/sec)) defined by a shear rate which is given when a shear stress of molten copolymer at 190° C. reaches 2.4×10$^6$ dyne/cm$^2$ and the melt flow rate (MFR) satisfy the relation
FI<150×MFR.

In the present invention, the above-mentioned at least two kinds of compounds (b) of Group IVB transition metals of the periodic table containing a ligand having a cyclopentadienyl skeleton preferably are:

at least one kind of a transition metal compound represented by the above formula [I], and at least one kind of a transition metal compound represented by the above formula [II].

The second ethylene/α-olefin copolymer according to the present invention is an ethylene/α-olefin copolymer obtained by copolymerizing ethylene with an α-olefin of 3 to 20 carbon atoms, wherein the ethylene/α-olefin copolymer has such properties that:

(i) the density is in the range of 0.850 to 0.980 g/cm$^3$, (ii) the melt flow rate (MFR) at 190° C. under a load of 2.16 kg is in the range of 0.01 to 200 g/10 min, (iii) the melt tension (MT (g)) at 190° C. and the melt flow rate (MFR) satisfy the relation
MT>2.2×MFR$^{-0.84}$, (iv) the flow index (FI (1/sec)) defined by a shear rate which is given when a shear stress of molten copolymer at 190° C. reaches 2.4×10$^6$ dyne/cm$^2$ and the melt flow rate (MFR) satisfy the relation
FI<150×MFR, (v) the molecular weight distribution (Mw/Mn) measured by GPC is in the range of 1.5 to 4, and (vi) MT/(Mw/Mn) and FI/MFR satisfy the relation
MT/(Mw/Mn)>0.03×FI/MFR−3.0
with the proviso that when the value of 0.03×FI/MFR−3.0 is less than 0, it is taken as 0.

These ethylene/α-olefin copolymers are excellent in moldability, and films obtained therefrom have high mechanical strength and high transparency.

The graft modified ethylene/α-olefin copolymer according to the present invention is a graft modified ethylene/α-olefin copolymer obtained by graft copolymerizing an ethylene/α-olefin copolymer with a polar monomer, wherein the ethylene/α-olefin copolymer is a copolymer obtained by copolymerizing ethylene with an α-olefin of 3 to 20 carbon atoms in the presence of a catalyst for olefin polymerization comprising (a) an organoaluminum oxy-compound and (b) a compound of Group IV transition metal of the periodic table containing a ligand having a cyclopentadienyl skeleton, and the ethylene/α-olefin copolymer has such properties that:

(i) the density is in the range of 0.850 to 0.980 g/cm$^3$, and (ii) the melt flow rate (MFR) at 190° C. under a load of 2.16 kg is in the range of 0.01 to 200 g/10 min.

The ethylene copolymer composition according to the present invention comprises [A] the above-mentioned graft modified ethylene/α-olefin copolymer and [B] polyolefin, wherein a weight ratio ([A]:[B]) between the graft modified ethylene/α-olefin copolymer [A] and the polyolefin [B] is in the range of 1:99 to 99:1.

The graft modified ethylene/α-olefin copolymer and the ethylene copolymer composition containing this copolymer are excellent in heat stability and moldability. From the copolymer or the composition, a film having high transparency, high mechanical strength and sufficient adhesion strength to highly polar materials can be produced.

DETAILED DESCRIPTION OF THE INVENTION

Figure 1:
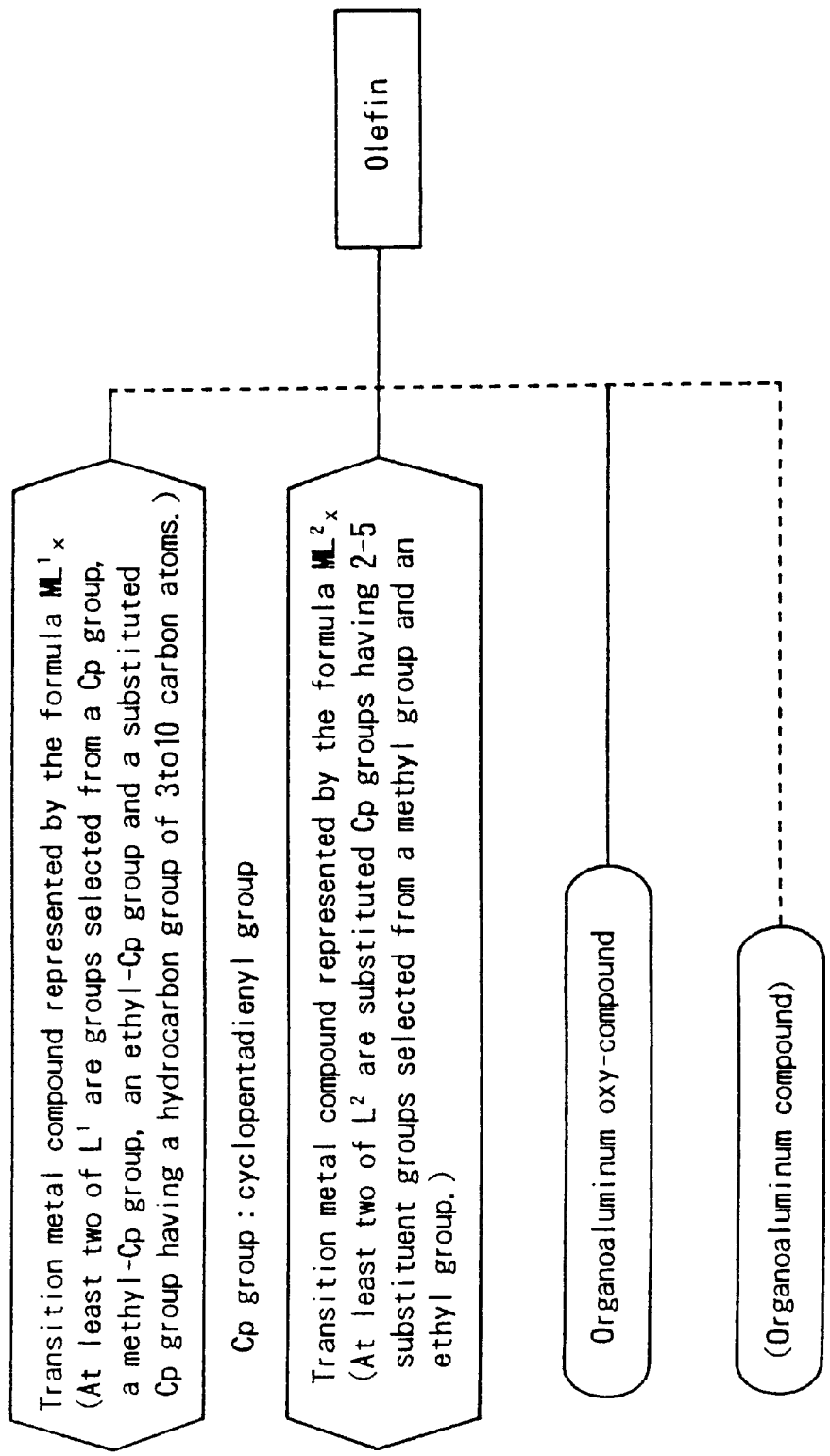
FIG. 1 is an explanatory view of a process for preparing the first and second catalysts for olefin polymerization according to the present invention.
Figure 2:
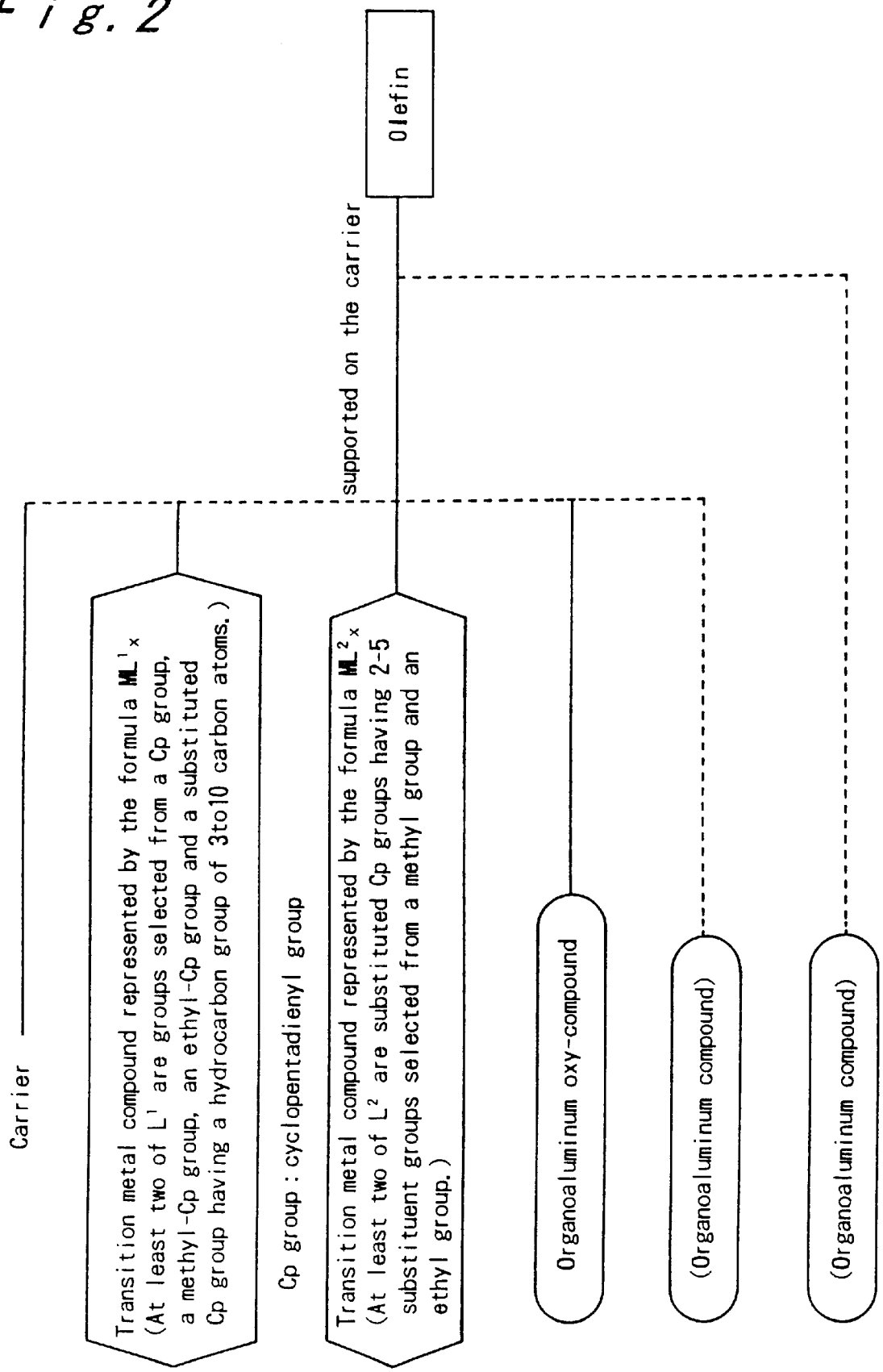
FIG. 2 is an explanatory view of a process for preparing the third to sixth catalysts for olefin polymerization according to the present invention.
Figure 3:
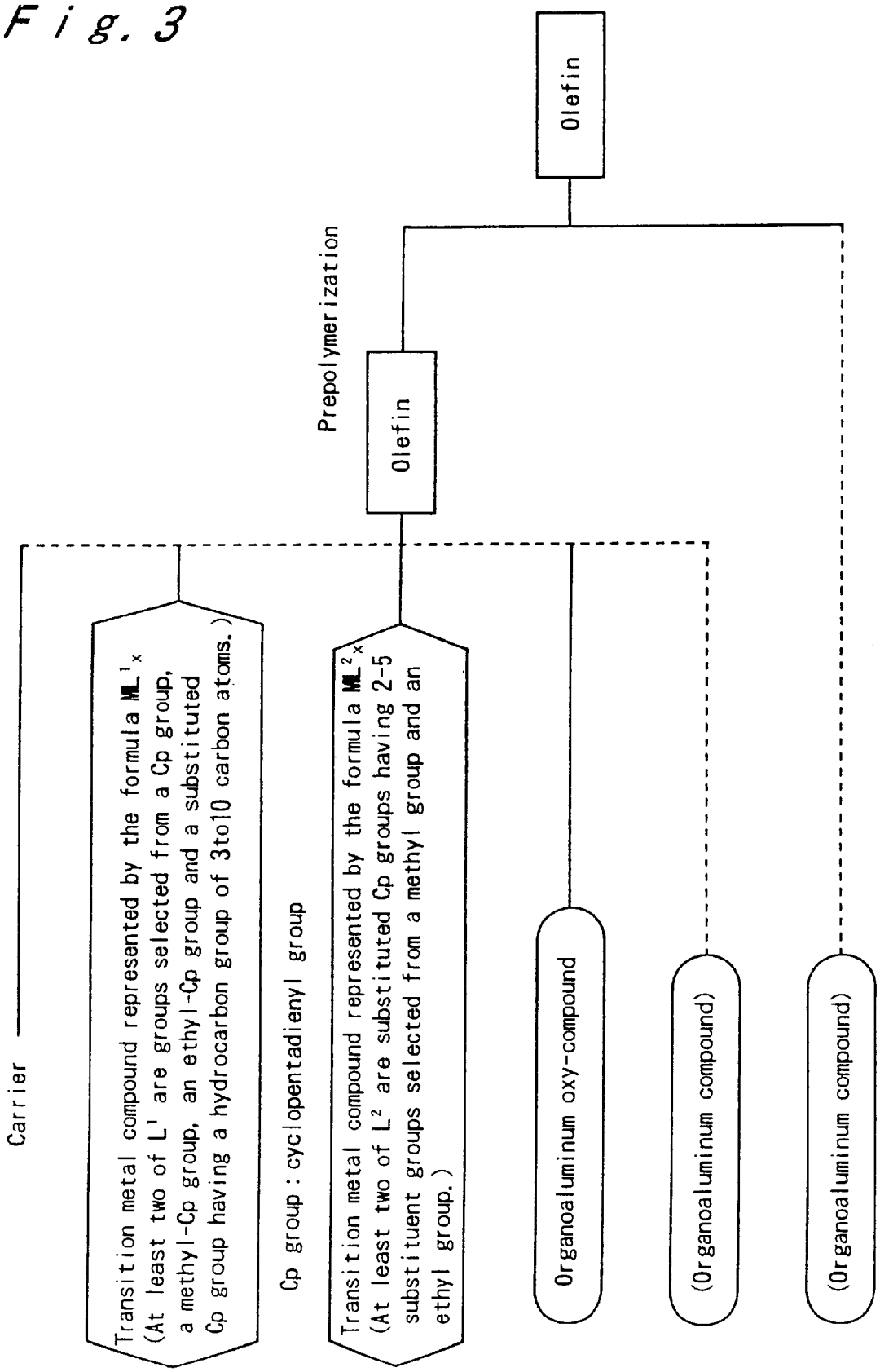
FIG. 3 is an explanatory view of a process for preparing the seventh to tenth catalysts for olefin polymerization according to the present invention.

The catalyst for olefin polymerization, the process for olefin polymerization using said catalyst, the ethylene/α- olefin copolymer, the graft modified ethylene/α-olefin copolymer and the ethylene copolymer composition, according to the present invention, will be described in detail hereinafter.

In this specification, the term "polymerization" is used to mean not only homopolymerization but also copolymerization, and the term "polymer" is used to mean not only a homopolymer but also a copolymer.

Each catalyst component used in the catalyst for olefin polymerization of the present invention is explained below.

The organoaluminum oxy-compound (a) (hereinafter sometimes referred to as "component (a)"] may be a known benzene-soluble aluminoxane or the benzene-insoluble organoaluminum oxy-compound having been disclosed in Japanese Patent L-O-P No. 276807/1990.

The above-mentioned aluminoxane may be prepared, for example, by the following procedures:

(1) a procedure for recovering an aluminoxane as its hydrocarbon solution which comprises adding an organoaluminum compound such as trialkylaluminum to a suspension in a hydrocarbon medium of a compound containing adsorbed water, or a salt containing water of crystallization such as magnesium chloride hydrate, copper sulfate hydrate, aluminum sulfate hydrate, nickel sulfate hydrate and cerium chloride hydrate, and reacting the organoaluminum compound;

(2) a procedure for recovering an aluminoxane as its hydrocarbon solution which comprises reacting water, ice or steam directly with an organoaluminum compound such as trialkylaluminum in a solvent such as benzene, toluene, ethyl ether and tetrahydrofuran; and (3) a procedure for recovering an aluminoxane which comprises reacting an organotinoxide such as dimethyltinoxide and dibutyltinoxide with an organoaluminum compound such as trialkylaluminum in a solvent such as decane, benzene or toluene.

Moreover, the aluminoxane may contain a small amount of an organometal component. Furthermore, the solvent or unreacted organoaluminum compound may be removed from the above-mentioned recovered aluminoxane-containing solution, by distillation, and the aluminoxane may be redissolved in a solvent.

Concrete examples of the organoaluminum compound used for the preparation of the aluminoxane include trialkylaluminum such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums such as tricyclohexylaluminum and tricyclooctylaluminum;

dialkylaluminum halides such as dimethylaluminum chloride, diethylaluminum chloride, diethylaluminum bromide and diisobutylaluminum chloride;

dialkylaluminum hydrides such as diethylaluminum hydride and diisobutylaluminum hydride;

dialkylaluminum alkoxides such as dimethylaluminum methoxide and diethylaluminum ethoxide; and dialkylaluminum aryloxides such as diethylaluminum phenoxide.

Of these compounds, trialkylaluminum and tricycloalkylaluminum are particularly preferable.

Furthermore, there may also be used as the organoaluminum compound isoprenylaluminum represented by the general formula (i-C$_4$H$_9$)$_x$Al$_y$(C$_5$H$_{10}$)$_z$ wherein x, y and z are each a positive number, and z≧2x.

The organoaluminum compounds mentioned above may be used either singly or in combination.

Solvents used for the solutions of the aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; and halogenated compounds derived from the above-mentioned aromatic hydrocarbons, aliphatic hydrocarbons and alicyclic hydrocarbons, especially chlorinated and brominated hydrocarbons.

In addition, there may also be used ethers such as ethyl ether and tetrahydrofuran. Of these solvents as exemplified above, aromatic hydrocarbons are particularly preferred.

The benzene-insoluble organoaluminum oxy-compounds used as component (a) contain an Al component soluble in benzene at 60° C. in an amount of not greater than 10%, preferably not greater than 5%, particularly preferably not greater than 2% in terms of Al atom, and they are insoluble or sparingly soluble in benzene.

Solubility in benzene of such organoaluminum oxy-compounds as mentioned above is obtained by suspending in 100 ml of benzene the organoaluminum oxy-compound in an amount corresponding to 100 mg atoms in terms of Al, mixing the resulting suspension at 60° C. for 6 hours with stirring, filtering the resulting mixture with a G-5 glass filter equipped with a jacket kept at 60° C., washing 4 times the solid portion separated on the filter with 50 ml of benzene at 60° C., and measuring the amount (x mmole) of Al atoms present in the whole filtrate.

Next, the transition metal compound catalyst components (b-I) and (b-II) are explained below.

The transition metal compound catalyst component (b-I) is a transition metal compound represented by the following formula [I], and the transition metal compound catalyst component (b-II) is a transition metal compound represented by the following formula [II].

$$ML^1_x \qquad [I]$$

In the formula [I], M is a transition metal atom selected from Group IVB of the periodic table, L$^1$ is a ligand coordinating to the transition metal atom, at least two of L$^1$ are groups selected from a cyclopentadienyl group, a methylcyclopentadienyl group, an ethylcyclopentadienyl group and a substituted cyclopentadienyl group having at least one substituent group selected from a hydrocarbon group of 3 to 10 carbon atoms, L$^1$ other than the (substituted) cyclopentadienyl group is a hydrocarbon group of 1 to 12 carbon atoms, an alkoxy group, an aryloxy group, a trialkylsilyl group, a halogen atom or a hydrogen atom. X is a valence of the transition metal atom M.

$$ML^2_x \qquad [II]$$

In the formula [II], M is a transition metal atom selected from Group IVB of the periodic table, L$^2$ is a ligand coordinating to the transition metal atom, at least two of L$^2$ are substituted cyclopentadienyl groups having 2–5 substituent groups selected from a methyl group and an ethyl group, and L$^2$ other than the substituted cyclopentadienyl group is a hydrocarbon group of 1 to 12 carbon atoms, an alkoxy group, an aryloxy group, a trialkylsilyl group, a halogen atom or a hydrogen atom. X is a valence of the transition metal atom M.

The transition metal compounds represented by the above formula [I] or [II] are explained below in detail.

In the above formula [I], M is a transition metal atom selected from Group IVB of the periodic table, and it is concretely zirconium, titanium or hafnium, preferably zirconium.

$L^1$ is a ligand coordinating to the transition metal atom M, and at least two of $L^1$ are groups selected from a cyclopentadienyl group, a methylcyclopentadienyl group, an ethylcyclopentadienyl group and a substituted cyclopentadienyl group having at least one substituent group selected from a hydrocarbon group of 3 to 10 carbon atoms. Each of ligand may be the same or different. $L^1$ other than the cyclopentadienyl group or the substituted cyclopentadienyl group is a hydrocarbon group of 1 to 12 carbon atoms, an alkoxy group, an aryloxy group, a trialkylsilyl group, a halogen atom or a hydrogen atom.

The substituted cyclopentadienyl group may have two or more of substituents. Each of substituent may be the same or different. When the substituted cyclopentadienyl has two or more of substituents, at least one substituent is a hydrocarbon group of 3 to 10 carbon atoms, and the other substituents are selected from a methyl group, an ethyl group and the hydrocarbon group of 3 to 10 carbon atoms.

Examples of the hydrocarbon group of 3 to 10 carbon atoms include alkyl group, cycloalkyl group, aryl group and aralkyl group. Concrete examples thereof include alkyl group such as n-propyl group, isopropyl group, n-butyl group, isobutyl group, sec-butyl group, t-butyl group, pentyl group, hexyl group, octyl group, 2-ethylhexyl group and decyl group; cycloalkyl group such as cyclopentyl group and cyclohexyl group; aryl group such as phenyl group and tolyl group; and aralkyl group such as benzyl group and neophyl group. Of these, preferred are alkyl groups, and particularly preferred are n-propyl group and n-butyl group.

In the present invention, the (substituted) cyclopentadienyl group coordinated to the transition metal is preferably the substituted cyclopentadienyl group, more preferably the cyclopentadienyl group substituted with alkyl group having 3 or more of carbon atoms, further preferably the substituted cyclopentadienyl group having two substituents, and particularly the 1,3-substituted cyclopentadienyl group.

In the above-mentioned formula [I], ligand $L^1$ other than the cyclopentadienyl group or the substituted cyclopentadienyl group is a hydrocarbon group of 1 to 12 carbon atoms, an alkoxy group, an aryloxy group, a trialkylsilyl group, a halogen atom or a hydrogen atom.

Examples of the hydrocarbon group of 1 to 12 carbon atoms include alkyl group, cycloalkyl group, aryl group and aralkyl group. Concrete examples thereof include alkyl group such as methyl group, ethyl group, n-propyl group, isopropyl group, n-butyl group, isobutyl group, sec-butyl group, t-butyl group, pentyl group, hexyl group, octyl group, 2-ethylhexyl group and decyl group; cycloalkyl group such as cyclopentyl group and cyclohexyl group; aryl group such as phenyl group and tolyl group; and aralkyl group such as benzyl group and neophyl group.

Examples of the alkoxy group include methoxy group, ethoxy group, n-propoxy group, isopropoxy group, n-butoxy group, isobutoxy group, sec-butoxy group, t-butoxy group, pentoxy group, hexoxy group and octoxy group.

Examples of the aryloxy group include phenoxy group and the like.

Examples of the trialkylsilyl group include trimethylsilyl group, triethylsilyl group and triphenylsilyl group.

Examples of the halogen atom include fluorine, hlorine, bromine and iodine.

Listed below are examples of the transition metal compound represented by the formula [I].

Bis(cyclopentadienyl)zirconium dichloride,
Bis(methylcyclopentadienyl)zirconium dichloride,
Bis(ethylcyclopentadienyl)zirconium dichloride,
Bis(n-propylcyclopentadienyl)zirconium dichloride,
Bis(n-butylcyclopentadienyl)zirconium dichloride,
Bis(n-hexylcyclopentadienyl)zirconium dichloride,
Bis(methyl-n-propylcyclopentadienyl)zirconium dichloride,
Bis(methyl-n-butylcyclopentadienyl)zirconium dichloride,
Bis(dimethyl-n-butylcyclopentadienyl)zirconium dichloride,
Bis(n-butylcyclopentadienyl)zirconium dibromide,
Bis(n-butylcyclopentadienyl)zirconium methoxychloride,
Bis(n-butylcyclopentadienyl)zirconium ethoxychloride,
Bis(n-butylcyclopentadienyl)zirconium butoxychloride,
Bis(n-butylcyclopentadienyl)zirconium diethoxide,
Bis(n-butylcyclopentadienyl)zirconium methylchloride
Bis(n-butylcyclopentadienyl)zirconium dimethyl,
Bis(n-butylcyclopentadienyl)zirconium benzylchloride,
Bis(n-butylcyclopentadienyl)zirconium dibenzyl,
Bis(n-butylcyclopentadienyl)zirconium phenylchloride, and
Bis(n-butylcyclopentadienyl)zirconium hydride chloride.

In the above exemplified compounds, di-substituted cyclopentadienyl include 1,2- and 1,3-substituted, and tri-substituted include 1,2,3- and 1,2,4-substituted. Also employable in the invention are transition metal compounds obtained by substituting titanium metal or hafnium metal for the zirconium metal in the above-exemplified zirconium compounds.

Of the above-exemplified transition metal compounds represented by the formula [I], particularly preferred are Bis(n-propylcyclopentadienyl)zirconium dichloride, Bis(n-butylcyclopentadienyl)zirconium dichloride, Bis(1-methyl-3-n-propylcyclopentadienyl)zirconium dichloride and Bis (1-methyl-3-n-butylcyclopentadienyl)zirconium dichloride.

In the above-mentioned formula [II], M is a transition metal selected from Group IVB of the periodic table, and concrete preferable examples of M include zirconium, titanium and hafnium. Of these, particularly preferred is zirconium.

$L^2$ is a ligand coordinated to the transition metal, and at least two of them are substituted cyclopentadienyl groups having 2–5 of substituents selected from a methyl group and an ethyl group. Each of ligand may be the same or different. The substituted cyclopentadienyl groups are the substituted cyclopentadienyl groups having 2 or more of substituents, preferably the substituted cyclopentadienyl groups having 2 or 3 of substituents, more preferably the substituted cyclopentadienyl groups having two substituents, particularly the 1,3-substituted cyclopentadienyl groups. Each of substituent may be the same or different.

In the above-mentioned formula [II], ligand $L^2$ other than the substituted cyclopentadienyl group is a hydrocarbon group of 1 to 12 carbon atoms, an alkoxy group, an aryloxy group, a trialkylsilyl group, a halogen atom or a hydrogen atom as similar to the ligand $L^1$ in the above-mentioned formula [I].

The transition metal compound represented by the general formula [II] include, for example, Bis(dimethylcyclopentadienyl)zirconium dichloride,
Bis(diethylcyclopentadienyl)zirconium dichloride,
Bis(methylethylcyclopentadienyl)zirconium dichloride,
Bis(dimethylethylcyclopentadienyl)zirconium dichloride,
Bis(dimethylcyclopentadienyl)zirconium dibromide,
Bis(dimethylcyclopentadienyl)zirconium methoxychloride,
Bis(dimethylcyclopentadienyl)zirconium ethoxychloride,
Bis(dimethylcyclopentadienyl)zirconium butoxychloride,
Bis(dimethylcyclopentadienyl)zirconium diethoxide,
Bis(dimethylcyclopentadienyl)zirconium methylchloride,
Bis(dimethylcyclopentadienyl)zirconium dimethyl,
Bis(dimethylcyclopentadienyl)zirconium benzylchloride,
Bis(dimethylcyclopentadienyl)zirconium dibenzyl,
Bis(dimethylcyclopentadienyl)zirconium phenylchloride,
and Bis(dimethylcyclopentadienyl)zirconium hydride chloride.

In the above exemplified compounds, di-substituted cyclopentadienyl include 1,2- and 1,3-substituted, and tri-substituted include 1,2,3- and 1,2,4-substituted.

There may also be used transition metal compounds obtained by substituting titanium or hafnium for zirconium in the above-exemplified zirconium compounds.

In the above-mentioned transition metal compounds represented by the general formula [II], particularly preferred is Bis(1,3-dimethylcyclopentadienyl)zirconium dichloride,
Bis(1,3-diethylcyclopentadienyl)zirconium dichloride, or
Bis(1-methyl-3-ethylcyclopentadienyl)zirconium dichloride.

In the invention, it is preferred to use a combination of at least one kind of a transition metal compound represented by the above formula [I] and at least one kind of a transition metal compound represented by the above formula [II] as the transition metal compound (b). In concrete, preferably used are a combination of bis(1,3-n-butylmethylcyclopentadienyl)zirconium dichloride and bis(1,3-dimethylcyclopentadienyl)zirconium dichloride, a combination of bis( 1,3-n-propylmethylcyclopentadienyl) zirconium dichloride and bis(1,3-dimethylcyclopentadienyl) zirconium dichloride, and a combination of bis(n-butylcyclopentadienyl)zirconium dichloride and bis(1,3-dimethylcyclopentadienyl)zirconium dichloride.

The above-mentioned at least one kind of a transition metal compound (b-I) represented by the formula [I] and at least one kind of a transition metal compound (b-II) represented by the formula [II] are desirably used in such amounts that the molar ratio [(b-I)/(b-II)] is in the range of 99/1 to 50/50, preferably 97/3 to 70/30, more preferably 95/5 to 75/25, most preferably 90/10 to 80/20.

A transition metal compound catalyst component containing at least one kind of a transition metal compound (b-I) represented by the formula [I] and at least one kind of a transition metal compound (b-II) represented by the formula [II] is sometimes referred to as "component (b)" hereinafter.

Examples of the organoaluminum compound (c) [hereinafter sometimes referred to as "component (c)"] include an organoaluminum compound represented by the following formula [III].

$$R^1_n AlX_{3-n} \quad [III]$$

wherein $R^1$ is a hydrocarbon group of 1 to 12 carbon atoms, X is a halogen atom or a hydrogen atom, and n is 1 to 3.

In the above formula [III], $R^1$ is a hydrocarbon group of 1 to 12 carbon atoms, for example, an alkyl group, a cycloalkyl group or an aryl group. Concrete examples of $R^1$ include methyl, ethyl, n-propyl, isopropyl, isobutyl, pentyl, hexyl, octyl, cyclopentyl, cyclohexyl, phenyl and tolyl.

Concrete examples of such organoaluminum compounds (c) include trialkylaluminum such as trimethylaluminum, triethylaluminum, triisopropylaluminum, triisobutylaluminum, trioctylaluminum and tri-2-ethylhexylaluminum;

alkenylaluminum such as isoprenylaluminum;

dialkylaluminum halides such as dimethylaluminum chloride, diethylaluminum chloride, diisopropylaluminum chloride, diisobutylaluminum chloride and dimethylaluminum bromide;

alkylaluminum sesquihalides such as methylaluminum sesquichloride, ethylaluminum sesquichloride, isopropylaluminum sesquichloride, butylaluminum sesquichloride and ethylaluminum sesquibromide;

alkylaluminum dihalides such as methylaluminum dichloride, ethylaluminum dichloride, isopropylaluminum dichloride and ethylaluminum dibromide; and alkylaluminum hydrides such as diethylaluminum hydride and diisobutylaluminum hydride.

Furthermore, there may also be used other organoaluminum compounds represented by the following formula [IV] as the organoaluminum compound catalyst component (c);

$$R^1_n AlY_{3-n} \quad [IV]$$

wherein $R^1$ is as defined previously, Y is $-OR^2$, $-OSiR^3_3$, $-OAlR^4_2$, $-NR^5_2$, $-SiR^6_3$ or $-N(R^7)AlR^8_2$, n is 1 to 2, $R^2$, $R^3$, $R^4$ and $R^8$ are each methyl, ethyl, isopropyl, isobutyl, cyclohexyl or phenyl, $R^5$ is hydrogen, methyl, ethyl, isopropyl, phenyl or trimethylsilyl, $R^6$ and $R^7$ are each methyl or ethyl.

The organoaluminum compounds as mentioned above include, in concrete, such compounds as enumerated below.

(1) Compounds of the formula $R^1 Al(OR^2)_{3-n}$ such as dimethylaluminum methoxide, diethylaluminum ethoxide and diisobutylaluminum methoxide.

(2) Compounds of the formula $R^1_n Al(OSiR^3_3)_{3-n}$ such as $Et_2Al(OSiMe_3)$, $(iso-Bu)_2Al(OSiMe_3)$ and $(iso-Bu)_2Al(OSiEt_3)$.

(3) Compounds of the formula $R^1_n Al(OAlR^4_2)_{3-n}$ such as $Et_2AlOAlEt_2$ and $(iso-Bu)_2AlOAl(iso-Bu)_2$.

(4) Compounds of the formula $R^1_n Al(NR^5_2)_{3-n}$ such as $Me_2AlNEt_2$, $Et_2AlNHMe$, $Me_2AlNHEt$, $Et_2AlN(SiMe_3)_2$, $(iso-Bu)_2AlN(SiMe_3)_2$.

(5) Compounds of the formula $R^1_n Al(SiR^6_3)_{3-n}$ such as $(iso-Bu)_2AlSiMe_3$.

(6) Compounds of the formula

such as

and

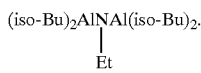

Of the organoaluminum compounds as exemplified above, preferred are those having the formulas $R^1_3Al$, $R^1_nAl(OR^2)_{3-n}$ and $R^1_nAl(OAlR^4_2)_{3-n}$, and particularly preferred are those having the above-mentioned formulas in which R is isoalkyl and n is 2.

The organoaluminum compound (d) [hereinafter sometimes referred to as "component (d)"] used in the present invention is the same as the above mentioned component (c).

The carrier used in the present invention is a solid inorganic or organic compound in granules or fine particles having a particle size of 10 to 300 μm, preferably 20 to 200 μm. Of these carriers, porous oxides are preferable as inorganic carriers. Concrete examples of the oxide carriers include $SiO_2$, $Al_2O_3$, MgO, $ZrO_2$, $TiO_2$, $B_2)_3$, CaO, ZnO, BaO, $ThO_2$, or a mixture of these compounds such as $SiO_2$-MgO, $SiO_2$-$Al_2)_3$, $SiO_2$-$TiO_2$, $SiO_2$-$V_2O_5$, $SiO_2$-$Cr_2O_3$ and $SiO_2$-$TiO_2$-MgO. Of these carriers, preferred are those comprising at least one compound selected from the group consisting of $SiO_2$ and $Al_2O_3$ as a major component.

Furthermore, the above-mentioned inorganic oxide or oxides may also contain a small amount of a carbonate, a sulfate, a nitrate and an oxide such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $LiO_2$.

Though the carriers have different properties among them depending on the types and preparation methods thereof, the carriers preferably used in the invention have specific surface area of 50 to 1000 m²/g, preferably 100 to 700 m²/g, a pore volume of desirably 0.3 to 2.5 cm³/g. The carriers are prepared if necessary by firing at a temperature of 100 to 1000° C., preferably 150 to 700° C.

It is also desirable that this carrier has an amount of adsorbed water of less than 1.0% by weight, preferably less than 0.5% by weight, and a surface hydroxyl group in an amount of 1.0% by weight or more, preferably 1.5–4.0% by weight and especially 2.0–3.5% by weight.

The amount of adsorbed water (% by weight) and that of the surface hydroxyl group (% by weight) are obtained by the following procedures.
(Amount of adsorbed water)

The specimen is dried at a temperature of 200° C., an ordinary pressure and in a nitrogen stream for 4 hours to measure a weight loss which is then taken as the amount of adsorbed water.
(Surface hydroxyl group)

The weight measured by drying the carrier at a temperature of 200° C., an ordinary pressure in a nitrogen stream for 4 hours is taken as X (g), and the carrier as dried is then calcined at a temperature of 1,000° C. for 20 hours to obtain a calcined product from which the surface hydroxyl groups have disappeared, and the weight of the calcination product as measured is taken as Y (g). The amount of the surface hydroxyl groups is calculated on the basis of the following equation.

Surface hydroxyl group (wt %)=[(X-Y)/X]×100

Moreover, there can be mentioned organic compounds in solid granules or fine solid particles each having a particle size of 10 to 300 μm as carriers which can be used as the carrier in the present invention. Examples of these organic compounds include (co)polymers containing as the main component constituent units derived from an α-olefin of 2 to 14 carbon atoms, such as ethylene, propylene, 1-butene and 4-methyl-1-pentene, or polymers or copolymers containing as the main component constituent units derived from vinylcyclohexane or styrene.

The first catalyst for olefin polymerization according to the invention is formed from the component (a) and the component (b). The second catalyst for olefin polymerization according to the invention is formed from the component (a), the component (b) and the component (c).

The first catalyst for olefin polymerization can be prepared by mixing and contacting the component (a) with the component (b) in or outside a polymerizer. Preferably, the component (a) is made solid component and the resultant solid component is mixed and contacted with the component (b) outside a polymerizer to prepare a solid catalyst, or the component (a) is mixed and contacted with the component (b) outside a polymerizer to prepare a solid catalyst, and then the solid catalyst thus prepared is added to the polymerization system.

The second catalyst for olefin polymerization can be prepared by mixing and contacting the component (a), the component (b) and the component (c) with each other in or outside a polymerizer. Preferably, the component (a) is made solid component and the resultant solid component is mixed and contacted with the component (b) outside a polymerizer to prepare a solid catalyst, or the component (a) is mixed and contacted with the component (b) outside a polymerizer to prepare a solid catalyst, and then the solid catalyst thus prepared is added to the polymerization system to contact it with the component (c) in the polymerization system.

The contact between the component (a) and the component (b) is carried out in an inert solvent. Though the mixing of each components may be conducted in an arbitrarily selected order, it is preferred to add the component (b) to a suspension of the component (a). Further, it is preferred that at least two kinds of the transition metal compounds are beforehand mixed to form the component (b) and then the component (b) is contacted with other component.

Concrete examples of the inert hydrocarbon solvent used herein include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures thereof.

When the components (a) and (b) or the components (a), (b) and (c) are mixed and contacted with each other to prepare the catalyst, a concentration of the aluminum atom in the component (a) is in the range of about 0.1 to 5 mol/l, preferably 0.3 to 3 mol/l. An atomic ratio (Al/transition metal) of the aluminum atom (Al) in the component (a) to the transition metal in the component (b) is in the range of usually 10 to 500, preferably 20 to 200. If the component (c) is used, an atomic ratio (Al-c/Al-a) of the aluminum atom (Al-c) in the component (c) to the aluminum atom (Al-a) in the component (a) is in the range of usually 0.02 to 3, preferably 0.05 to 1.5. The temperature for contacting the components (a) and (b) or contacting the components (a), (b) and (c) is in the range of usually −50 to 150° C., preferably −20 to 120° C., and the period of time therefor is in the range of usually 1 minute to 50 hours, preferably 10 minutes to 25 hours.

In the first catalyst for olefin polymerization prepared above, the transition metal atom derived from the component (b) is desirably contained in an amount of $5 \times 10^{-6}$ to $5\times10^{-4}$ g·atom, preferably $10^{-5}$ to $2\times10^{-4}$ g·atom, per 1 g of the catalyst, and the aluminum atom derived from the component (a) is desirably contained in an amount of $10^{-2}$ to $2.5\times10^{-2}$ g·atom, preferably $1.5\times10^{-2}$ to $2\times10^{-2}$ g·atom, per 1 g of the catalyst.

In the second catalyst for olefin polymerization prepared above, the transition metal atom derived from the component (b) is desirably contained in an amount of $5\times10^{-6}$ to $5\times10^{-4}$ g·atom, preferably $10^{-5}$ to $2\times10^{-4}$ g·atom, per 1 g of the catalyst, and the aluminum atom derived from the component (a) and the component (c) is desirably contained in an amount of $10^{-2}$ to $2.5\times10^{-2}$ g·atom, preferably $1.5\times10^{-2}$ to $2\times10^{-2}$ g·atom, per 1 g of the catalyst.

The third catalyst for olefin polymerization according to the invention is a solid catalyst (component) in which the component (a) (organoaluminum oxy-compound) and the component (b) (at least two kinds of transition metal compounds) are supported on the carrier.

The fourth catalyst for olefin polymerization according to the invention is formed from a solid catalyst component (C-1) in which the component (a) and the component (b) are supported on the carrier, and the component (d) (organoaluminum compound).

The fifth catalyst for olefin polymerization according to the invention is a solid catalyst (component) in which the component (a), the component (b) and the component (c) (organoaluminum compound) are supported on the carrier.

The sixth catalyst for olefin polymerization according to the invention is formed from a solid catalyst component (C-2) in which the component (a), the component (b) and the component (c) are supported on the carrier, and the component (d).

The third catalyst for olefin polymerization (solid catalyst component (C-1)) according to the invention can be prepared by contacting the components (a) and (b) with the carrier.

The fifth catalyst for olefin polymerization (solid catalyst component (C-2)) according to the invention can be prepared by contacting the components (a), (b) and (c) with the carrier.

In the preparation of the third catalyst for olefin polymerization (solid catalyst component (C-1)), the contact between the carrier, the component (a) and the component (b) may be conducted in an arbitrarily selected order, but it is preferred to contact the carrier with the component (a), followed by contacting the component (b).

In the preparation of the fifth catalyst for olefin polymerization (solid catalyst component (C-2)), the contact between the carrier and the components (a) to (c) may be conducted in an arbitrarily selected order, but it is preferred to contact the carrier with the component (a) and then with the component (b), followed by contacting the component (c).

Further, it is preferred that at least two kinds of the transition metal compounds are beforehand mixed to form the component (b) and then the component (b) is contacted with other components.

The contact of the carrier with the components (a) to (c) can be carried out in an inert hydrocarbon solvent. Concrete examples of the inert hydrocarbon solvent used herein are the same as described before.

In the contact of the carrier with the components (a) and (b) or in the contact of the carrier with the components (a) to (c), the component (b) is used in an amount of usually $5\times10^{-6}$ to $5\times10^{-4}$ mol, preferably $10^{-5}$ to $2\times10^{-4}$ mol, per 1 g of the carrier, and the concentration of the component (b) is in the range of about $10^{-4}$ to $2\times10^{-2}$ mol/l (solvent), preferably $2\times10^{-4}$ to $10^{-2}$ mol/l (solvent). An atomic ratio (Al/transition metal) of the aluminum atom (Al) in the component (a) to the transition metal in the component (b) is in the range of usually 10 to 500, preferably 20 to 200. An atomic ratio (Al-c/Al-a) of the aluminum atom (Al-c) in the component (c) to the aluminum atom (Al-a) in the component (a) is in the range of usually 0.02 to 3, preferably 0.05 to 1.5. The temperature for contacting the carrier with the components (a) and (b) or contacting the carrier with the components (a) to (c) is in the range of usually −50 to 150° C., preferably −20 to 120° C., and the period of time therefor is in the range of 1 minute to 50 hours, preferably 10 minutes to 25 hours.

In the third catalyst for olefin polymerization (solid catalyst component (C-1)) prepared above, the transition metal atom derived from the component (b) is desirably supported in an amount of $5\times10^{-6}$ to $5\times10^{-4}$ g·atom, preferably $10^{-5}$ to $2\times10^{-4}$ g·atom, per 1 g of the carrier, and the aluminum atom derived from the component (a) is desirably supported in an amount of $10^{-3}$ to $5\times10^{-2}$ g·atom, preferably $2\times10^{-3}$ to $2\times10^{-2}$ g·atom, per 1 g of the carrier.

The fourth catalyst for olefin polymerization is formed from the above-mentioned solid catalyst component (C-1) and the organoaluminum compound (d). In this catalyst, the component (d) is desirably employed in such an amount that the atomic ratio (Al/M) of the aluminum atom derived from the component (d) to the transition metal atom (M) derived from the transition metal compound in the solid catalyst component (C-1) is in the range of 5 to 300, preferably 10 to 200, more preferably 15 to 150.

In the fifth catalyst for olefin polymerization (solid catalyst component (C-2)), the transition metal atom derived from the component (b) is desirably supported in an amount of $5\times10^{-6}$ to $5\times10^{-4}$ g·atom, preferably $10^{-5}$ to $2\times10^{-4}$ g·atom, per 1 g of the carrier, and the aluminum atom derived from the component (a) and the component (c) is desirably supported in an amount of $10^{-3}$ to $5\times10^{-2}$ g·atom, preferably $2\times10^{-3}$ to $2\times10^{-2}$ g·atom, per 1 g of the carrier.

The sixth catalyst for olefin polymerization is formed from the above-mentioned solid catalyst component (C-2) and the organoaluminum compound (d). In this catalyst, the component (d) is desirably employed in such an amount that the atomic ratio (Al/M) of the aluminum atom derived from the compound (d) to the transition metal atom (M) derived from the transition metal compound in the solid catalyst component (C-2) is in the range of 5 to 300, preferably 10 to 200, more preferably 15 to 150.

The seventh catalyst for olefin polymerization according to the invention is a prepolymerized catalyst (component) obtained by prepolymerizing an olefin on the solid catalyst component (C-1) in which the component (a) (organoaluminum oxy-compound) and the component (b) (at least two kinds of transition metal compounds) are supported on the carrier.

The eighth catalyst for olefin polymerization according to the invention is formed from a prepolymerized catalyst component (C-3) obtained by prepolymerizing an olefin on the solid catalyst component (C-1), and the component (d) (organoaluminum compound).

The ninth catalyst for olefin polymerization according to the invention is a prepolymerized catalyst (component) obtained by prepolymerizing an olefin on the solid catalyst component (C-2) in which the component (a), the component (b) and the component (c) (organoaluminum compound) are supported on the carrier.

The tenth catalyst for olefin polymerization according to the invention is formed from a prepolymerized catalyst component (C-4) obtained by prepolymerizing an olefin on the solid catalyst component (C-2), and the component (d) (organoaluminum compound).

The seventh catalyst for olefin polymerization (prepolymerized catalyst component (C-3)) according to the invention can be prepared by introducing an olefin into an inert hydrocarbon solvent in the presence of the carrier, the component (a) and the component (b) to perform prepolymerization. The carrier, the component (a) and the component (b) preferably form the above-mentioned solid catalyst component (C-1). In this case, the component (a) or the component (c) may be further added in addition to the solid catalyst component (C-1).

The ninth catalyst for olefin polymerization (prepolymerized catalyst component (C-4)) according to the invention can be prepared by introducing an olefin into an inert hydrocarbon solvent in the presence of the carrier and the components (a) to (c) to preform prepolymerization. The carrier and the components (a) to (c) preferably form the above-mentioned solid catalyst component (C-2). In this case, the component (a) or the component (c) may be further added in addition to the solid catalyst component (C-2).

Examples of the olefins used for the prepolymerization include ethylene, and α-olefins having 3 to 20 carbon atoms such as propylene, 1-butene, 1-pentene, 4-methyl-1-pentene, 1-hexene, 1-octene, 1-decene, 1-dodecene and 1-tetradecene. Of these, particularly preferred is ethylene or a combination of ethylene and the same α-olefin as used for the polymerization.

Examples of the inert hydrocarbon solvent used herein are the same as used for preparing the aforementioned solid catalyst component.

In the prepolymerization, the component (b) is used in an amount of usually $10^{-6}$ to $2 \times 10^{-2}$ mol/l (solvent), preferably $5 \times 10^{-5}$ to $10^{-2}$ mol/l (solvent), in terms of the transition metal atom in the component (b). Further, the component (b) is used in an amount of usually $5 \times 10^{-6}$ to $5 \times 10^{-4}$ mol, preferably $10^{-5}$ to $2 \times 10^{-4}$ mol, in terms of the transition metal atom in the component (b), per 1 g of the carrier. An atomic ratio (Al/transition metal) of the aluminum atom (Al) in the component (a) to the transition metal in the component (b) is in the range of usually 10 to 500, preferably 20 to 200. An atomic ratio (Al-c/Al-a) of the aluminum atom (Al-c) in the component (c) to the aluminum atom (Al-a) in the component (a) is in the range of usually 0.02 to 3, preferably 0.05 to 1.5.

The temperature for the prepolymerization is in the range of −20 to 80° C., preferably 0 to 60° C., and the period of time therefor is in the range of 0.5 to 100 hours, preferably 1 to 50 hours.

The prepolymerization may be carried out either batchwise or continuously, and may be carried out under reduced pressure, atmospheric pressure or application of pressure. In the prepolymerization, hydrogen is desirably allowed to exist to obtain a prepolymer having an intrinsic viscosity [η], as measured in decalin at 135° C., of 0.2 to 7 dl/g, preferably 0.5 to 5 dl/g.

The catalyst for olefin polymerization according to the invention can be prepared, for example, in the following manner. First, the carrier is suspended in an inert hydrocarbon to give a suspension. To the suspension is added the organoaluminum oxy-compound (component (a)) to perform reaction for a predetermined time. Then, a supernatant liquid is removed, and the resultant solid component is again suspended in an inert hydrocarbon. Subsequently, to the system are added the transition metal compounds (component (b)) to perform reaction for a predetermined time. A supernatant liquid is removed again to obtain a solid catalyst component. The solid catalyst component thus obtained is added to an inert hydrocarbon containing the organoaluminum compound (component (c)), followed by introducing an olefin, to obtain a prepolymerized catalyst (component).

In the seventh catalyst for olefin polymerization (prepolymerized catalyst component (C-3)) prepared above, it is desired that a prepolymer is prepared in an amount of 0.1 to 500 g, preferably 0.2 to 300 g, more preferably 0.5 to 200 g, per 1 g of the carrier; the component (b) is supported in an amount of about $5 \times 10^{-6}$ to $5 \times 10^{-4}$ g·atom, preferably $10^{-5}$ to $2 \times 10^{-4}$ g·atom, in terms of the transition metal atom in the component (b), per 1 g of the carrier; and the aluminum atom (Al) derived from the component (a) is supported in such an amount that the molar ratio (Al/M) of the aluminum atom (Al) derived from the component (a) to the transition metal atom (M) derived from the component (b) is in the range of 5 to 200, preferably 10 to 150.

The eighth catalyst for olefin polymerization according to the invention is formed from the above-mentioned prepolymerized catalyst component (C-3) and the organoaluminum compound (d). In this catalyst, the component (d) is desirably employed in such an amount that the molar ratio (Al/M) of the aluminum atom (Al) derived from the component (d) to the transition metal atom (M) derived from the component (b) in the prepolymerized catalyst component (C-3) is in the range of 5 to 300, preferably 10 to 200, more preferably 15 to 150.

In the ninth catalyst for olefin polymerization (prepolymerized catalyst component (C-4)), it is desired that a prepolymer is prepared in an amount of 0.1 to 500 g, preferably 0.2 to 300 g, more preferably 0.5 to 200 g, per 1 g of the carrier; the component (b) is supported in an amount of about $5 \times 10^{-6}$ to $5 \times 10^{-4}$ g·atom, preferably $10^{-5}$ to $2 \times 10^{-4}$ g·atom, in terms of the transition metal atom in the component (b), per 1 g of the carrier; and the aluminum atom (Al) derived from the component (a) and the component (c) is supported in such an amount that the molar ratio (Al/M) of the aluminum atom (Al) derived from the component (a) and the component (c) to the transition metal atom (M) derived from the component (b) is in the range of 5 to 200, preferably 10 to 150.

The tenth catalyst for olefin polymerization according to the invention is formed from the above-mentioned prepolymerized catalyst component (C-4) and the organoaluminum compound (d). In this catalyst, the component (d) is desirably employed in such an amount that the molar ratio (Al/M) of the aluminum atom (Al) derived from the component (d) to the transition metal atom (M) derived from the component (b) in the prepolymerized catalyst component (C-4) is in the range of 5 to 300, preferably 10 to 200, more preferably 15 to 150.

In the present invention, polymerization or copolymerization of olefin is carried out in the presence of any of the first to tenth catalysts for olefin polymerization in either a gas phase or a liquid phase such as slurry. In the slurry polymerization, an inert hydrocarbon may be used as a solvent, or the olefin itself may be used as a solvent.

Examples of the inert hydrocarbon solvent used in the slurry polymerization include aliphatic hydrocarbons, such as propane, butane, isobutane, pentane, hexane, octane, decane, dodecane, hexadecane and octadecane; alicyclic hydrocarbons, such as cyclopentane, methylcyclopentane, cyclohexane and cyclooctane; aromatic hydrocarbons, such as benzene, toluene and xylene; and petroleum fractions, such as gasoline, kerosine and gas oil. Of these, preferred are aliphatic hydrocarbons, alicyclic hydrocarbons and petroleum fractions.

In the slurry polymerization or the gas phase polymerization, the above-mentioned catalyst is used in such an amount that the concentration of the transition metal atom in the polymerization reaction system is in the range of usually $10^{-8}$ to $10^{-3}$ g·atom/l, preferably $10^{-7}$ to $10^{-4}$ g·atom/l. In the polymerization, an unsupported organoaluminum oxy-compound may be used in addition to the organoaluminum oxy-compound supported on the carrier. In this case, the atomic ratio (Al/M) of the aluminum atom (Al) derived from the unsupported aluminum oxy-compound to the transition metal atom (M) derived from the transition metal compounds (b-I) and (b-II) is in the range of 5 to 300, preferably 10 to 200, more preferably 15 to 150.

In the invention, the temperature for the slurry polymerization is in the range of usually −50 to 100° C., preferably 0 to 90° C., while the temperature for the gas phase polymerization is in the range of usually 0 to 120° C., preferably 20 to 100° C.

The polymerization pressure is in the range of usually atmospheric pressure to 100 kg/cm$^2$, preferably 2 to 50 kg/cm$^2$. The polymerization may be carried out batchwise, semi-continuously or continuously.

Further, the polymerization may be conducted in two or more stages having different reaction conditions.

The catalyst for olefin polymerization according to the invention may contain other components useful for the olefin polymerization than the above-mentioned components.

Examples of olefins polymerizable in the presence of the catalyst for olefin polymerization according to the invention include:

ethylene, and α-olefins of 3 to 20 carbon atoms such as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene; and cycloolefins of 3 to 20 carbon atoms, such as cyclopentene, cycloheptene, norbornene, 5-methyl-2-norbornene, tetracyclododecene, 2-methyl-1,4,5,8-dimethano-1,2,3,4,4a,5,8,8a-octahydronaphthalene.

Also employable are styrene, vinylcyclohexane, diene, etc.

The catalyst for olefin polymerization and the process for olefin polymerization according to the invention are suitably used especially for copolymerization of ethylene with an α-olefin of 3 to 20 carbon atoms.

Next, the ethylene/α-olefin copolymer according to the present invention will be described below in detail.

The first and second ethylene/α-olefin copolymers of the invention can be prepared by copolymerizing ethylene with an α-olefin of 3 to 20 carbon atoms in the presence of a catalyst for olefin polymerization comprising, for example, the organoaluminum oxy-compound (a) and at least two kinds of the compounds (b) of Group IV transition metals of the periodic table containing a ligand having a cyclopentadienyl skeleton in such a manner that the resultant copolymer has a density of 0.850 to 0.980 g/cm$^3$.

When the copolymerization of ethylene with an α-olefin of 3 to 20 carbon atoms is carried out in the presence of the aforementioned catalyst for olefin polymerization formed from the organoaluminum oxy-compound (a), at least two kinds of the transition metal compounds (b), the carrier, and if necessary the organoaluminum compound (c), the ethylene/α-olefin copolymer of the invention can be prepared with high polymerizability.

The first and second ethylene/α-olefin copolymers according to the invention are each a random copolymer of ethylene with an α-olefin of 3 to 20 carbon atoms. Examples of the α-olefin of 3 to 20 carbon atoms employable for the copolymerization with ethylene include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In each of the first and second ethylene/α-olefin copolymers, it is desired that constituent units derived from ethylene are present in an amount of 50 to 100% by weight, preferably 55 to 99% by weight, more preferably 65 to 98% by weight, most preferably 70 to 96% by weight, and constituent units derived from an α-olefin of 3 to 20 carbon atoms are present in an amount of 0 to 50% by weight, preferably 1 to 45% by weight, more preferably 2 to 35% by weight, most preferably 4 to 30% by weight.

The composition of an ethylene/α-olefin copolymer is generally determined by $^{13}$C-NMR spectrum analysis of a sample prepared by homogeneously dissolving about 200 mg of the copolymer in 1 ml of hexachlorobutadiene in a sample tube having a diameter of 10 mm under the conditions of a measuring temperature of 120° C., a measuring frequency of 25.05 MHz, a spectrum width of 1,500 Hz, a pulse repetition period of 4.2 sec and a pulse width of 6 μsec.

The first ethylene/α-olefin copolymer according to the invention preferably has the following properties (i) to (iv), and particularly preferably has the following properties (i) to (ix). The second ethylene/α-olefin copolymer according to the invention preferably has the following properties (i) to (vi), and particularly preferably has the following properties (i) to (ix).

(i) The density (d) is in the range of usually 0.850 to 0.980 g/cm$^3$, preferably 0.880 to 0.960 g/cm$^3$, more preferably 0.890 to 0.935 g/cm$^3$, most preferably 0.905 to 0.930 g/cm$^3$.

The density (d) is determined by means of a density gradient tube using a strand, which has been obtained at the time of measurement of a melt flow rate (MFR) at 190° C. under a load of 2.16 kg and which is treated by heating at 120° C. for 1 hour and slowly cooling to room temperature over 1 hour.

(ii) The melt flow rate (MFR) is in the range of usually 0.01 to 200 g/10 min, preferably 0.05 to 50 g/10 min, more preferably 0.1 to 10 g/10 min.

The melt flow rate (MFR) is determined in accordance with ASTM D1238-65T under the conditions of a temperature of 190° C. and a load of 2.16 kg.

(iii) The melt tension (MT (g)) and the melt flow rate (MFR) satisfy the relation:

MT>2.2×MFR$^{-0.84}$, preferably 8.0×MFR$^{-0.84}$ >MT>2.3×MFR$^{-0.84}$, more preferably 7.5×MFR$^{-0.84}$ >MT>2.5×MFR$^{-0.84}$, An ethylene/α-olefin copolymer having such properties shows good moldability because of high melt tension (MT).

The melt tension (MT (g)) is determined by measuring a stress given when a molten copolymer is stretched at a constant rate. That is, a powdery polymer was melted in a conventional manner, and the molten polymer was pelletized to give a measuring sample. Then, the MT of the sample was measured under the conditions of a resin temperature of 190° C., an extrusion rate of 15 mm/min and a take-up rate of 10 to 20 m/min using a MT measuring apparatus (produced by Toyo Seiki Seisakusho K.K.) having a nozzle diameter of 2.09 mmφ and a nozzle length of 8 mm. During the pelletization, to the ethylene/α-olefin copolymer were added 0.05% by weight of tri(2,4-di-t-butylphenyl)

phosphate as a secondary antioxidant, 0.1% by weight of n-octadecyl-3-(4'-hydroxy-3',5'-di-t-butylphenyl)propionate as a heat stabilizer and 0.05% by weight of calcium stearate as a hydrochloric acid absorbent.

(iv) The flow index (FI (l/sec)) defined by a shear rate which is given when a shear stress of a molten copolymer at 190° C. reaches $2.4 \times 10^6$ dyne/cm² and the melt flow rate (MFR) satisfy the relation:

FI<150×MFR, preferably FI<140×MFR, more preferably FI<130×MFR.

The flow index (FI) is determined by extruding a resin from a capillary while changing a shear rate and measuring the shear rate given when the shear stress reaches the above-mentioned value. In this measurement, the same sample as described in the above-mentioned MT measurement is used, and the FI is measured under the conditions of a resin temperature of 190° C. and a shear stress of about $5 \times 10^4$ to $3 \times 10^6$ dyne/cm² using a capillary type flow property tester produced by Toyo Seiki Seisakusho K.K.

In the measurement, a diameter of the nozzle (capillary) is changed as follows depending on the MFR (g/10 min) of the resin to be measured:

in the case of MFR>20:0.5 mm in the case of 20≧MFR>3:1.0 mm in the case of 3>MFR>0.8:2.0 mm, and in the case of 0.8>MFR:3.0 mm.

(v) The molecular weight distribution (Mw/Mn, Mw: weight-average molecular weight, Mn: number-average molecular weight) measured by GPC is in the range of 1.5 to 4.

The molecular weight distribution (Mw/Mn) was measured in the following manner using a measuring device of GPC-150C produced by Millipore Co.

This measurement was carried out using a column of TSK-GNH-HT having a diameter of 72 mm and a length of 600 mm at a column temperature of 140° C. In this measurement, 500 microliters-of a sample having a concentration of 0.1% by weight was introduced into the column in which o-dichlorobenzene (available from Wako Junyaku Kogyo K.K.) as a mobile phase was moved at a moving rate of 1.0 ml/min. In the mobile phase, 0.025% by weight of BHT (available from Takeda Chemical Industries, Ltd.) was contained as an antioxidant. A differential refractometer was used as a detector. With respect to the standard polystyrene of Mw<1,000 and Mw>$4 \times 10^6$, those available from Toso Co. were used, and with respect to the standard polystyrene of 1,000<Mw<$4 \times 10^6$, those available from Pressure Chemical Co. were used.

(vi) MT/(Mw/Mn) and FI/MFR satisfy the relation:

MT/(Mw/Mn)>0.03×FI/MFR−3.0 with the proviso that when the value of 0.03×FI/MFR−3.0 is less than 0, it is taken as 0, preferably 0.03×FI/MFR+1.0 >MT/(Mw/Mn)>0.03×FI/MFR−2.8 with the proviso that when the value of 0.03×FI/MFR−2.8 is less than 0, it is taken as 0, more preferably 0.03×FI/MFR+0.8 >MT/(Mw/Mn)>0.03×FI/MFR−2.5 with the proviso that when the value of 0.03×FI/MFR−2.5 is less than 0, it is taken as 0.

With increase of the value of Mw/Mn, the value of MT becomes large, so that an index of MT/(Mw/Mn) is used in order to reduce an influence of the Mw/Mn value on the MT value. Likewise, with increase of the value of MFR, the value of FI becomes large, so that an index of FI/MFR is used in order to reduce an influence of the MFR value on the FI value.

(vii) The temperature (Tm (° C.)) at which the endothermic curve of the copolymer measured by a differential scanning calorimeter (DSC) shows the maximum peak and the density (d) satisfy the relation:

Tm<400×d−250, preferably Tm<450×d−297, more preferably Tm<500×d−344, particularly preferably Tm<550×d×391.

The temperature (Tm (° C.) ) at which the endothermic curve of an ethylene/α-olefin copolymer measured by a differential scanning calorimeter (DSC) shows the maximum peak is sought from an endothermic curve obtained by filling about 5 mg of a sample in an aluminum pan, heating to 200° C. at a rate of 10° C./min, holding the sample at 200° C. for 5 minutes, lowering the temperature to room temperature at a rate of 20° C./min and then heating at a rate of 10° C./min. This measurement is carried out using a DSC-7 type apparatus produced by Perkin Elmer Co.

(viii) The quantity fraction (W (% by weight)) of a n-decane-soluble component at 23° C. and the density (d) satisfy the relation:

in the case of MFR≦10 g/10 min:

W<80×exp(−100 (d−0.88))+0.1, preferably W<60×exp(−100(d−0.88))+0.1, more preferably W<40×exp(−100(d−0.88))+0.1, and in the case of MFR>10 g/10 min:

W<80×(MFR−9)$^{0.26}$×exp(−100(d−0.88))+0.1.

The measurement of the n-decane-soluble component quantity of an ethylene/α-olefin copolymer (polymer having a smaller soluble component quantity has a narrower composition distribution) is carried out by adding about 3 g of the copolymer to 450 ml of n-decane, dissolving the copolymer at 145° C., cooling the resultant solution to 23° C., removing a n-decane-insoluble portion by filtration, and recovering a n-decane-soluble portion from the filtrate.

It may be concluded that the ethylene/α-olefin copolymer which satisfies the above-mentioned relation between the temperature (Tm) at which the endothermic curve measured by a differential scanning calorimeter (DSC) shows the maximum peak and the density (d), and the relation between the quantity fraction (W) of the n-decane-soluble component and the density (d), has a narrow composition distribution.

(ix) The number of unsaturated bonds existing in the molecule is not more than 0.5 per 1,000 carbon atoms and is less than 1 per 1 molecule of the polymer.

The determination of the unsaturated bonds is made by means of $^{13}$C-NMR spectrum analysis. In detail, an area intensity of signals given by a carbon atom forming a bond other than a double bond, namely, an area intensity of signals in the range of 10 to 50 ppm, and an area intensity of signals given by a carbon atom forming a double bond, namely, an area intensity of signals in the range of 105 to 150 ppm, are sought from the integral curve, and from the ratio therebetween, the number of the unsaturated bonds is determined.

The first and second ethylene/α-olefin copolymers according to the invention may contain various additives if desired, for example, weathering stabilizer, heat stabilizer, antistatic agent, anti-slip agent, anti-blocking agent, antifogging agent, lubricant, pigment, dye, nucleating agent, plasticizer, anti-aging agent, hydrochloric acid absorbent and antioxidant, provided that the object of the invention is not marred.

The first and second ethylene copolymers according to the invention may be processed by a conventional molding method, for example, air-cooling inflation molding, two-stage air-cooling inflation molding, high-speed inflation molding, T-die film molding and water-cooling inflation molding, to obtain films. The films thus obtained are excellent in transparency and mechanical strength, and retain properties inherent in general LLDPE, such as heat-sealing properties, hot-tack properties, heat resistance and blocking resistance. Further, the films are free from surface stickiness because the ethylene/α-olefin copolymers have a prominently narrow composition distribution. Moreover, because of high melt tension, the ethylene/α-olefin copolymers are good in bubble stability in the inflation molding stage.

The films obtained from the first and second ethylene/α-olefin copolymers of the invention are suitable for various packaging bags such as standard bags, sugar bags, packaging bags for oily goods and packaging bags for moist goods, and agricultural materials. The films may also be used as multi-layer films by laminating them on various substrates such as a nylon substrate and a polyester substrate.

Next, the graft modified ethylene/α-olefin copolymer and the ethylene copolymer composition according to the present invention will be described below in detail.

The graft modified ethylene/α-olefin copolymer of the invention is a graft modified ethylene/α-olefin copolymer obtained by graft copolymerizing the ethylene/α-olefin copolymer having the aforementioned properties (i) and (ii), preferably having the properties (i) to (iv), more preferably having the properties (i) to (vi), particularly preferably having the properties (i) to (ix), with a polar monomer.

The graft modified ethylene/α-olefin copolymer of the invention can be obtained by causing such an ethylene/α-olefin copolymer as mentioned above to react with a polar monomer described below in the presence of a radical initiator.

Examples of the polar monomer include hydroxyl group-containing ethylenic unsaturated compounds, amino group containing ethylenic unsaturated compounds, epoxy group-containing ethylenic unsaturated compounds, aromatic vinyl compounds, unsaturated carboxylic acids, derivatives of these acids, vinyl ester compounds and vinyl chloride.

Concrete examples of the hydroxyl group-containing ethylenic unsaturated compounds include (meth)acrylates, such as hydroxyethyl (meth)acrylate, 2-hydroxypropyl (meth)acrylate, 3-hydroxypropyl (meth)acrylate, 2-hydroxy-3-phenoxypropyl (meth)acrylate, 3-chloro-2-hydroxypropyl (meth)acrylate, glycerol mono(meth)acrylate, pentaerythritol mono(meth)acrylate, trimethylolpropane mono(meth)acrylate, tetramethylolethane mono(meth)acrylate, butanediol mono(meth)acrylate, polyethylene glycol mono(meth) acrylate and 2-(6- hydroxyhexanoyloxy)ethyl acrylate; and other compounds, such as 10-undecene-1-ol, 1-octene-3-ol, 2-methanol norbornene, hydroxystyrene, hydroxethyl vinyl ether, hydroxybutyl vinyl ether, N-methylolacrylamide, 2-(meth)acryloyloxyethyl acid phosphate, glycerol monoallyl ether, allyl alcohol, allyloxyethanol, 2-butene-1,4-diol and glycerol monoalcohol.

The amino group-containing ethylenic unsaturated compound is a compound having an ethylenic double bond and an amino group. An example of such compound is a vinyl monomer having at least one substituted or unsubstituted amino group represented by the following formula:

wherein $R^1$ is hydrogen, a methyl group or an ethyl group; and $R^2$ is hydrogen, an alkyl group having 1 to 12 carbon atoms, preferably 1 to 8 carbon atoms, or a cycloalkyl group having 6 to 12 carbon atoms, preferably 6 to 8 carbon atoms. These alkyl and cycloalkyl groups may further have a substituent group.

Concrete examples of such amino group-containing ethylenic unsaturated compound include alkyl acrylate type and alkyl methacrylate type derivatives, such as aminoethyl (meth)acrylate, propylaminoethyl (meth)acrylate, dimethylaminoethyl methacrylate, aminopropyl (meth)acrylate, phenylaminoethyl methacrylate and cyclohexylaminoethyl methacrylate; vinyl amine type derivatives, such as N-vinyldiethylamine and N-acetylvinylamine; allylamine type derivatives, such as allylamine, methacrylamine, N-methylacrylamine, N,N-dimethylacrylamide and N,N-dimethylaminopropylacrylamide; acrylamide type derivatives, such as acrylamide and N-methylacrylamide; aminostyrenes, such as p-aminostyrene; and other compounds, such as 6-aminohexyl succinimide and 2-aminoethyl succinimide.

The epoxy group-containing ethylenic unsaturated compound is a monomer having a polymerizable unsaturated bond and at least one epoxy group in one molecule.

Concrete examples of such epoxy group-containing ethylenic unsaturated compound include:

glycidyl acrylate and glycidyl methacrylate;

mono and alkylglycidyl esters of dicarboxylic acids (number of carbon atoms of the alkyl group in the case of monoglycidyl ester: 1–12), such as monoglycidyl maleate, diglycidyl maleate, monoglycidyl fumarate, diglycidyl fumarate, monoglycidyl crotonate, diglycidyl crotonate, monoglycidyl tetrahydrophthalate, diglycidyl tetrahydrophthalate, monoglycidyl itaconate, diglycidyl itaconate, monoglycidyl butenetricarboxylate, diglycidyl butenetricarboxylate, monoglycidyl citraconate, diglycidyl citraconate, monoglycidyl ester of endo-cis-bicyclo[2.2.1]hept-5-ene-2,3-dicarboxylic acid (nadic acid™), diglycidyl ester thereof, monoglycidyl ester of endo-cis-bicyclo [2.2.1]hept-5-ene-2-methyl-2,3-dicarboxylic acid (methylnadic acid™), diglycidyl ester thereof, monoglycidyl allylsuccinate and diglycidyl allylsuccinate; and other compounds, such as alkylglycidyl p-styrenecarboxylate, allyl glycidyl ether, 2-methylallyl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinylcyclohexene monoxide.

The aromatic vinyl compound is, for example, a compound represented by the following formula:

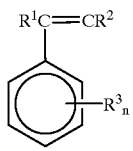

wherein $R^1$ and $R^2$ are each independently hydrogen or an alkyl group of 1 to 3 carbon atoms (concretely, methyl, ethyl, propyl or isopropyl), $R^3$ is a hydrocarbon group of 1 to 3 carbon atoms (concretely, methyl, ethyl, propyl or isopropyl) or a halogen atom (concretely, chlorine, bromine or iodine), and n is an integer of 0 to 5, preferably an integer of 1 to 5.

Concrete examples of such aromatic vinyl compound include styrene, α-methylstyrene, o-methylstyrene, p-methylstyrene, m-methylstyrene, p-chlorostyrene, m-chlorostyrene, p-chloromethylstyrene, 4-vinylpyridine, 2-vinylpyridine, 5-ethyl-2-vinylpyridine, 2-methyl-5-vinylpyridine, 2-isopropenylpyridine, 2-vinylquinoline, 3-vinylisoquinoline, N-vinylcarbazole and N-vinylpyrrolidone.

Examples of the unsaturated carboxylic acids include unsaturated carboxylic acids, such as acrylic acid, methacrylic acid, maleic acid, fumaric acid, tetrahydrophthalic acid, itaconic acid, citraconic acid, crotonic acid, isocrotonic acid, norbornenedicarboxylic acid and bicyclo[2,2,1]hept-2-ene-5,6-dicarboxylic acid; anhydrides of these acids; and derivatives of these acids (e.g., acid halides, amides, imides and esters). Concrete examples of such compounds include malenyl chloride, malenyl imide, maleic anhydride, itaconic anhydride, citraconic anhydride, tetrahydrophthalic anhydride, bicyclo[2,2,1]hept-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2,2,1]hept-2-ene-5,6-dicarboxylate, hydroxyethyl (meth)acrylate, hydroxypropyl (meth)acrylate, glycidyl (meth)acrylate, aminoethyl methacrylate and aminopropyl methacrylate.

Of these, preferably used are (meth)acrylic acid, maleic anhydride, hydroxyethyl (meth)acrylate, glycidyl methacrylate and aminopropyl methacrylate.

Examples of the vinyl ester compounds include vinyl acetate, vinyl propionate, vinyl n-butyrate, vinyl isobutyrate, vinyl pivalate, vinyl caproate, vinyl versatate, vinyl laurate, vinyl stearate, vinyl benzoate, vinyl p-t-butyl benzoate, vinyl salicylate and vinyl cyclohexanecarboxylate.

The polar monomer is used in an amount of usually 1 to 100 parts by weight, preferably 5 to 80 parts by weight, per 100 parts by weight of the ethylene/α-olefin copolymer.

As the radical initiator, organic peroxides and azo compounds can be employed.

Examples of the organic peroxides include dicumyl peroxide, di-t-butyl peroxide, 2,5-dimethyl-2,5-bis(t-butylperoxy)hexane, 2,5-dimethyl-2,5-bis(t-butylperoxy)hexyne-3, 1,3-bis(t-butylperoxyisopropyl)benzene, 1,1-bis(t-butylperoxy)valerate, benzoyl peroxide, t-butyl peroxybenzoate, acetyl peroxide, isobutyryl peroxide, octanoyl peroxide, decanoyl peroxide, lauroyl peroxide, 3,5,5-trimethylhexanoyl peroxide, 2,4-dichlorobenzoyl peroxide and m-toluyl peroxide. Examples of the azo compounds include azoisobutyronitrile and dimethylazoisobutyronitrile.

The radical initiator is desirably used in an amount of 0.001 to 10 parts by weight per 100 parts by weight of the ethylene/α-olefin copolymer.

The radical initiator may be used by mixing it per se with the ethylene/α-olefin copolymer and the polar monomer, or may be used in the form of a solution containing it in a small amount of an organic solvent. There is no specific limitation on the organic solvent used herein, and any organic solvents may be used as far as they can dissolve the radical initiator. Examples of such organic solvents include aromatic hydrocarbon type solvents, such as benzene, toluene and xylene; aliphatic hydrocarbon type solvents, such as pentane, hexane, heptane, octane, nonane and decane; alicyclic hydrocarbon type solvents, such as cyclohexane, methylcyclohexane and decahydronaphthalene; chlorinated hydrocarbon type solvents, such as chlorobenzene, dichlorobenzene, trichlorobenzene, methylene chloride, chloroform, carbon tetrachloride and tetrachloroethylene; alcohol type solvents, such as methanol, ethanol, n-propanol, iso-propanol, n-butanol, sec-butanol and tert-butanol; ketone type solvents, such as acetone, methyl ethyl ketone and methyl isobutyl ketone; ester type solvents, such as ethyl acetate and dimethyl phthalate; and ether type solvents, such as dimethyl ether, diethyl ether, di-n-amyl ether, tetrahydrofuran and dioxyanisole.

In the graft modification of the ethylene/α-olefin copolymer, a reducing material may be employed. The reducing material serves to increase the graft amount in the resultant graft modified ethylene/α-olefin copolymer.

Examples of the reducing material include iron(II) ion, chromium ion, cobalt ion, nickel ion, palladium ion, sulfite, hydroxylamine, hydrazine and a compound containing —SH, $SO_3H$, —$NHNH_2$ or —COCH (OH)—.

Concrete examples of such reducing material include ferrous chloride, potassium bichromate, cobalt chloride, cobalt naphthenate, palladium chloride, ethanolamine, diethanolamine, N,N-dimethylaniline, hydrazine, ethylmercaptan, benzenesulfonic acid and p-toluenesulfonic acid.

The reducing material is used in an amount of usually 0.001 to 5 parts by weight, preferably 0.1 to 3 parts by weight, per 100 parts by weight of the ethylene/α-olefin copolymer.

The graft modification of the ethylene/α-olefin copolymer can be carried out by a conventionally known process. For example, the ethylene/α-olefin copolymer is dissolved in an organic solvent, and to the resultant solution are added the polar monomer, the radical initiator, etc. to perform reaction at a temperature of 70 to 200° C., preferably 80 to 190° C., for a period of 0.5 to 15 hours, preferably 1 to 10 hours.

As the organic solvent used in the graft modification of the ethylene/α-olefin copolymer, any organic solvents may be used without any specific limitation as far as they can dissolve the ethylene/α-olefin copolymer.

Concrete examples of such organic solvents include aromatic hydrocarbon type solvents, such as benzene, toluene and xylene; and aliphatic hydrocarbon type solvents, such as pentane, hexane and heptane.

The graft modified ethylene/α-olefin copolymer may also be prepared by causing the ethylene/α-olefin copolymer to react with the polar monomer in an extruder or the like without using any solvent. In this case, the reaction temperature is generally not lower than the melting point of the ethylene/α-olefin copolymer, concretely, in the range of 120 to 250° C., and the reaction time is generally in the range of 0.5 to 10 minutes.

In the graft modified ethylene/α-olefin copolymer prepared above, the graft amount of the graft group derived from the polar group is usually in the range of 0.1 to 50% by weight, preferably 0.2 to 30% by weight.

The ethylene copolymer composition according to the present invention is formed from the above-mentioned graft modified ethylene/α-olefin copolymer [A] and polyolefin [B].

Polyolefin [B]

The polyplefin [B] used for forming the ethylene copolymer composition of the invention is a homopolymer of ethylene or an α-olefin of 3 to 20 carbon atoms, or a copolymer of at least two kinds of monomers selected from ethylene and α-olefins of 3 to 20 carbon atoms.

Examples of the α-olefins of 3 to 20 carbon atoms include propylene, 1-butene, 1-pentene, 2-methyl-1-butene, 3-methyl-1-butene, 1-hexene, 3-methyl-1-pentene, 4-methyl-1-pentene, 3,3-dimethyl-1-butene, 1-heptene, methyl-1-hexene, dimethyl-1-pentene, trimethyl-1-butene, ethyl-1-pentene, 1-octene, methyl-1-pentene, dimethyl-1-hexene, trimethyl-1-pentene, ethyl-1-hexene, methylethyl-1-pentene, diethyl-1-butene, propyl-1-pentene, 1-decene, methyl-1-nonene, dimethyloctene, trimethyl-1-heptene, ethyl-1-octene, methylethyl-1-heptene, diethyl-1-hexene, 1-dodecene and hexadodecene.

The polyolefin [B] is preferably a homopolymer of ethylene or an α-olefin of 3 to 8 carbon atoms, or a copolymer of at least two kinds of monomers selected from ethylene and α-olefins of 3 to 8 carbon atoms.

The polyolefin [B] used for forming the ethylene copolymer composition of the invention contains repeating units derived from ethylene or an α-olefin of 3 to 20 carbon atoms in an amount of usually not less than 50% by mol, preferably not less than 80% by mol, more preferably 100% by mol.

The polyolefin [B] may further contain repeating units derived from other compounds polymerizable with the α-olefin in addition to the repeating units derived from ethylene or the α-olefin of 3 to 20 carbon atoms.

Examples of the other compounds include chain polyene compounds, cyclic polyene compounds and cyclic monoene compounds.

These polyene compounds are those having at least two conjugated or non-conjugated olefinic double bonds.

Examples of the chain polyene compounds include 1,4-hexadiene, 1,5-hexadiene, 1,7-octadiene, 1,9-decadiene, 2,4,6-octatriene, 1,3,7-octatriene, 1,5,9-decatriene and divinylbenzene.

Examples of the cyclic polyene compounds include 1,3-cyclopentadiene, 1,3-cyclohexadiene, 5-ethyl-1,3-cyclohexadiene, 1,3-cycloheptadiene, dicyclopentadiene, dicyclohexadiene, 5-ethylidene-2-norbornene, 5-vinyl-2-norbornene, 5-isopropylidene-2-norbornene, methylhydroindene, 2,3-diisopropylidene-5-norbornene, 2-ethylidene-3-isopropylidene-5-norbornene, 2-ethylidene-3-isopropylidene-5-norbornene and 2-propenyl-2,5-norbornadiene.

Examples of the cyclic monoene compounds include:
monocycloalkenes, such as cyclopropene, cyclobutene, cyclopentene, cyclohexene, 3-methylcyclohexene, cycloheptene, cyclooctene, cyclodecene, cyclododecene, tetracyclodecene, octacyclodecene and cycloeicosene;
bicycloalkenes, such as norbornene, 5-methyl-2-norbornene, 5-ethyl-2-norbornene, 5-isobutyl-2-norbornene, 5,6-dimethyl-2-norbornene, 5,5,6-trimethyl-2-norbornene and 2-bornene;
tricycloalkenes, such as 2,3,3a,7a-tetrahydro-4,7-methano-1H-indene and 3a,5,6,7a-tetrahydro-4,7-methano-1H-indene;
tetracycloalkenes, such as 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-stearyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene and 2,3-dichloro-1,4,5,8-dimethano-1,2,3,4,4a,5,8,8a-octahydronaphthalene; and
polycycloalkenes, such as
hexacyclo[6,6,1,1$^{3.6}$,1$^{10.13}$,0$^{2.7}$,0$^{9.14}$]heptadecene-4, pentacyclo[8,8,1$^{2.9}$,1$^{4.7}$,1$^{11.18}$,0,0$^{3.8}$,0$^{12.17}$]heneicosene-5 and
octacyclo[8,8,1$^{2.9}$,1$^{4.7}$,1$^{11.18}$,0,0$^{3.8}$,0$^{12.17}$]docosene-5.

The polyolefin [B] may further contain constituent units derived from styrene or substituted styrene.

It is desired that the polyolefin [B] has an intrinsic viscosity [η], as measured in decalin at 135° C., of usually 0.4 to 7 dl/g, preferably 0.5 to 5 dl/g.

The polyolefin [B] for forming the ethylene copolymer composition of the invention can be prepared by polymerizing or copolymerizing the above-mentioned α-olefin by a conventionally known process. The (co)polymerization reaction may be carried out either in a gas phase (gas phase process) or in a liquid phase (liquid phase process).

Ethylene Copolymer Composition

The ethylene copolymer composition according to the invention comprises the above-mentioned graft modified ethylene/α-olefin copolymer [A] and polyolefin [B]. A weight ratio ([A]:[B]) between the graft modified ethylene/α-olefin copolymer [A] and the polyolefin [B] is in the range of 1:99 to 99:1, preferably 2:98 to 98:2.

The ethylene copolymer composition of the invention may contain various additives if desired, for example, weathering stabilizer, heat stabilizer, antistatic agent, antislip agent, anti-blocking agent, anti-fogging agent, lubricant, pigment, dye, nucleating agent, plasticizer, anti-aging agent, hydrochloric acid absorbent and antioxidant, provided that the object of the invention is not marred.

The ethylene copolymer composition according to the present invention can be prepared by known processes, for example, processes described below.

(1) A process of mechanically blending the ethylene/α-olefin copolymer [A], the polyolefin [B], and if necessary, other optional components using an extruder, a kneader or the like.

(2) A process comprising dissolving the ethylene/α-olefin copolymer [A], the polyolefin [B], and if necessary, other optional components in an appropriate good solvent (e.g., hydrocarbon solvent such as hexane, heptane, decane, cyclohexane, benzene, toluene and xylene) and, then removing the solvent from the resulting solution.

(3) A process comprising independently dissolving the ethylene/α-olefin copolymer [A], the polyolefin [B], and if necessary, other optional components in an appropriate good solvent to prepare solutions, then mixing the solutions, and removing the solvent from the resulting mixture.

(4) A process in any combination of the above processes (1) to (3).

The graft modified ethylene/α-olefin copolymer and the ethylene copolymer composition according to the invention may be processed by a conventional molding method, for example, normal press molding, air-cooling inflation molding, two-stage air-cooling inflation molding, high-speed inflation molding, T-die film molding or water-cooling inflation molding, to obtain films. The films thus obtained are excellent in transparency and mechanical strength, and retain properties inherent in general LLDPE, such as heat-sealing properties, hot-tack properties, heat resistance and blocking resistance. Further, the films are free from surface stickiness because the graft modified ethylene/α-olefin copolymer has a prominently narrow composition distribution.

The films obtained from the graft modified ethylene/α-olefin copolymer and the ethylene copolymer composition according to the invention are suitable for various packaging bags such as standard bags, sugar bags, packaging bags for oily goods and packaging bags for moist goods, and agricultural materials. Further, because of their high adhesion strength to nylon, polyester, a metal foil, etc., the films may be used as multi-layer films by laminating them on these substrates.

EFFECT OF THE INVENTION

By the use of the catalyst for olefin polymerization or the process for olefin polymerization according to the present invention, an olefin polymer having high melt tension and good moldability can be prepared. From such olefin polymer, a film of high transparency and high mechanical strength can be produced.

The ethylene/α-olefin copolymer of the present invention has high melt tension and good moldability. From such ethylene/α-olefin copolymer, a film of high transparency and high mechanical strength can be produced.

The graft modified ethylene/α-olefin copolymer of the present invention has high melt tension, good moldability and high transparency and shows sufficient adhesion strength to highly polar materials.

The ethylene copolymer composition of the present invention is obtained by blending the graft modified ethylene/α-olefin copolymer [A] having a narrow composition distribution, good heat stability and good moldability, with the polyolefin [B]. From such composition, a film having sufficient adhesion strength to highly polar materials and high transparency can be produced.

EXAMPLE

The present invention is further described below with reference to examples, but it should be construed that the present invention is in no way limited to those examples.

In the invention, physical properties of films were evaluated in the following manner.

Haze

The haze was measured in accordance with ASTM-D-1003-61.

Gloss

The gloss was measured in accordance with JIS Z8741.

Film Impact

The film impact was measured by means of a pendulum type film impact tester produced by Toyo Seiki Seisakusho K.K.

Adhesion Strength

A pressed sheet of a modified copolymer having a thickness of 100 μm was used as a sample. The sample was heat sealed with two kinds of adherends respectively and the peel strength was measured to evaluate the adhesion strength. One adherend is an aluminum foil having a thickness of 0.5 mm, and the other adherend is a 6-nylon sheet having a thickness of 1.0 mm. The heat sealing of the pressed sheet with the adherend was conducted using a heat sealer under the conditions of a temperature of 200° C., a load of 1 kg/cm$^2$ and a period of 60 sec. After the heat sealing, the pressed sheet with the adherend was cut to give a specimen having a width of 25 mm and a length of 150 mm. The adhesion strength of the specimen was measured by peeling the adherend layer in the direction of 180° against the modified polymer layer at a peel rate of 200 mm/min.

Example 1

Preparation of a Solid Catalyst

Into a pressure-reducible 400 ml reactor equipped with a stirrer was introduced 70 ml of a toluene solution containing 100 mmol (in terms of Al atom) of methylaluminoxane (available from Schering Co.). Then, to the reactor was added 100 ml of decane over a period of 30 minutes with stirring of the solution at room temperature to precipitate methylaluminoxane. Subsequently, the temperature of the system was elevated to 35° C. to remove toluene over 3 hours under a reduced pressure, so as to further precipitate methylaluminoxane.

The suspension obtained above was filtered through a filter to remove a liquid phase portion, and a solid portion was again suspended in decane. To the resultant suspension were added 5.3 ml of a toluene solution containing 0.18 mmol of bis(1,3-n-butylmethylcyclopentadienyl)zirconium dichloride and 0.7 ml of a toluene solution containing 0.02 mmol of bis( 1,3-dimethylcyclopentadienyl)zirconium dichloride. Thereafter, the reaction liquid was stirred for 1 hour at room temperature and then filtered to remove a liquid phase portion to prepare a solid catalyst. In 1 g of the solid catalyst, zirconium was contained in an amount of 6.2 mg and aluminum was contained in an amount of 460 mg.

Polymerization

A 2-liter stainless autoclave thoroughly purged with nitrogen was charged with 150 g of sodium chloride (special grade, available from Wako Junyaku K.K.), followed by drying at 90° C. for 1 hour under a reduced pressure. Then, into the autoclave was introduced a mixed gas consisting of ethylene, 1-butene and hydrogen (1-butene content: 2.6% by mol, hydrogen content: 0.012% by mol) to recover the pressure in the system to atmospheric pressure, and the temperature of the system was set to 70° C.

Subsequently, to the autoclave were added 0.007 mg·atom (in terms of zirconium atom) of the solid catalyst prepared above and 0.7 mmol of triisobutylaluminum.

Thereafter, a mixed gas having the same composition as described above was introduced into the autoclave to initiate polymerization at the total pressure of 8 kg/cm$^2$-G. The temperature in the system immediately rose to 80 ° C.

Then, only the mixed gas was supplied to keep the total pressure at 8 kg/cm$^2$-G, and polymerization was further conducted at 80° C. for 1.5 hours.

After the polymerization was completed, the reaction product was washed with water to remove sodium chloride. Then, the remaining polymer was washed with methanol and dried at 80° C. overnight under a reduced pressure. As a result, an ethylene/1-butene copolymer having MFR, as measured at 190° C. under a load of 2.16 kg, of 1.8 g/10 min, a density of 0.923 g/cm$^3$ and a decane-soluble portion at 23° C. of 0.18% by weight was obtained in an amount of 234 g.

The ethylene/1-butene copolymer thus obtained was subjected to inflation by the use of a single-screw extruder (20 mmφ·L/D=26) equipped with a die of 25 mmφ (lip width: 0.7 mm) and a single-slit air ring under the conditions of an air flow rate of 90 l/min, an extrusion rate of 9 g/min, a blow ratio of 1.8, a take-up rate of 2.4 m/min and a processing temperature of 200° C., to form a film having a thickness of 30 μm.

Melt properties and other properties of the copolymer and physical properties of the film formed from the copolymer are set forth in Table 1.

As is evident from Table 1, an inflation film excellent in moldability (MT), optical characteristics and strength was obtained from the above copolymer.

Example 2

Preparation of a Solid Catalyst

The procedure for preparing the solid catalyst in Example 1 was repeated except for varying the amounts of the zirconium compounds to those given below, to prepare a solid catalyst.

Bis(1,3-n-butylmethylcyclopentadienyl)zirconium dichloride: 0.16 mmol

Bis(1,3-dimethylcyclopentadienyl)zirconium dichloride: 0.04 mmol

In 1 g of the solid catalyst, zirconium was contained in an amount of 6.1 mg and aluminum was contained in an amount of 470 mg.

Polymerization

The procedure for the polymerization in Example 1 was repeated except for varying the composition of the mixed gas consisting of ethylene, 1-butene and hydrogen to that given below.

1-Butene content: 2.3% by mol

Hydrogen content: 0.011% by mol

As a result, an ethylene/1-butene copolymer having MFR of 1.4 g/10 min, a density of 0.925 g/cm³ and a decane-soluble portion at 23° C. of 0.19% by weight was obtained in an amount of 240 g.

The ethylene/1-butene copolymer was subjected to inflation in the same manner as described in Example 1 to form a film having a thickness of 30 μm.

Melt properties and other properties of the copolymer and physical properties of the film formed from the copolymer are set forth in Table 1.

As is evident from Table 1, an inflation film excellent in moldability (MT), optical characteristics and strength was obtained from the above copolymer.

Example 3

Preparation of a Solid Catalyst

The procedure for preparing the solid catalyst in Example 1 was repeated except for varying the amounts of the zirconium compounds to those given below, to prepare a solid catalyst.

Bis(1,3-n-butylmethylcyclopentadienyl)zirconium dichloride: 0.14 mmol

Bis(1,3-dimethylcyclopentadienyl)zirconium dichloride: 0.06 mmol

In 1 g of the solid catalyst, zirconium was contained in an amount of 6.2 mg and aluminum was contained in an amount of 470 mg.

Polymerization

The procedure for the polymerization in Example 1 was repeated except for varying the composition of the mixed gas consisting of ethylene, 1-butene and hydrogen to that given below.

1-Butene content: 2.7% by mol

Hydrogen content: 0.010% by mol

As a result, an ethylene/1-butene copolymer having MFR of 1.1 g/10 min, a density of 0.922 g/cm³ and a decane-soluble portion at 23° C. of 0.19% by weight was obtained in an amount of 224 g.

The ethylene/1-butene copolymer was subjected to inflation in the same manner as described in Example 1 to form a film having a thickness of 30 μm.

Melt properties and other properties of the copolymer and physical properties of the film formed from the copolymer are set forth in Table 1.

As is evident from Table 1, an inflation film excellent in moldability (MT), optical characteristics and strength was obtained from the above copolymer.

TABLE 1

| | Comonomer | | Catalyst[*1] | MFR | | | | |
|---|---|---|---|---|---|---|---|---|
| | Kind | Amount mol. % | I/II | g/10-min by mol | g/10-min | [η] dl/g | Mw/Mn | Density g/cm³ |
| Ex. 1 | 1-butene | 2.8 | | 9/1 | 1.8 | 1.84 | 2.1 | 0.923 |
| Ex. 2 | 1-butene | 2.5 | | 8/2 | 1.4 | 1.90 | 2.4 | 0.925 |
| Ex. 3 | 1-butene | 2.8 | | 7/3 | 1.1 | 1.97 | 2.8 | 0.922 |

| | n-Decane Soluble Portion wt. % | Tm ° C. | MT g | [*2] | FI s⁻¹ | [*3] | $\frac{MT}{(Mw/Mn)}$ | [*4] |
|---|---|---|---|---|---|---|---|---|
| Ex. 1 | 0.18 | 111.2 | 2.4 | 1.3 | 102 | 270 | 1.14 | 0 |
| Ex. 2 | 0.19 | 111.4 | 3.1 | 1.7 | 138 | 210 | 1.29 | 0 |
| Ex. 3 | 0.19 | 111.0 | 4.7 | 2.0 | 105 | 165 | 1.68 | 0 |

| Physical Properties of Film | | | | |
|---|---|---|---|---|
| | Haze % | Gloss % | Impact Strength kg · cm/cm | Moldability [*5] |
| Ex. 1 | 4.1 | 105 | 1,870 | BB |
| Ex. 2 | 4.5 | 84 | 1,780 | AA |
| Ex. 3 | 6.4 | 57 | 1,990 | AA |

*1 Zirconium compound in the catalyst component
I: bis(1,3-n-butylmethylcyclopentadienyl)zirconium dichloride
II: bis(1,3-dimethylcyclopentadienyl)zirconium dichloride
*2: value of 2.2 × MFR$^{-0.84}$
*3: value of 150 × MFR
*4: value of 0.03 × FI/MFR-3.0 (in the case of less than 0, the value is taken as 0)
*5 Moldability
AA: MT ≧ 3 g
BB: 3 g > MT ≧ 2 g
CC: 2 g > MT Example 4

5.0 kg of silica having been dried at 250° C. for 10 hours was suspended in 80 liters of toluene, and the resultant suspension was cooled to 0° C. Thereafter, to the suspension was dropwise added 28.7 liters of a toluene solution of methylaluminoxane (Al: 1.33 mol/l) over a period of 1 hour. During the addition, the temperature of the system was kept at 0° C. The reaction was successively carried out at 0° C. for 30 minutes. Then, the temperature of the system was elevated to 95° C. over a period of 1.5 hours, and at the same temperature the reaction was conducted for 20 hours. After that, the temperature of the system was lowered to 60° C., and the supernatant liquid was removed by decantation.

The solid portion obtained above was washed twice with toluene and then again suspended in 80 liters of toluene. To the reaction system were dropwise added 7.4 liters of a toluene solution of bis(1,3-n-butylmethylcyclopentadienyl) zirconium dichloride (Zr: 34.0 mmol/l) and 1.0 liter of a toluene solution of bis(1,3-dimethylcyclopentadienyl) zirconium dichloride (Zr: 28.1 mmol/l) at 80° C. over a period of 30 minutes to further carry out reaction at 80° C. for 2 hours. Then, the supernatant liquid was removed, and the residue was washed twice with hexane to obtain a solid catalyst containing zirconium in an amount of 3.6 mg per 1 g of the solid catalyst.

Polymerization

A 2-liter stainless autoclave thoroughly purged with nitrogen was charged with 150 g of sodium chloride (special grade, available from Wako Junyaku K.K.), followed by drying at 90° C. for 1 hour under a reduced pressure. Then, into the autoclave was introduced a mixed gas consisting of ethylene, 1-butene and hydrogen (1-butene content: 2.6% by mol, hydrogen content: 0.012% by mol) to recover the pressure in the system to atmospheric pressure, and the temperature of the system was set to 70° C.

Subsequently, to the autoclave were added 0.007 mg·atom (in terms of zirconium atom) of the solid catalyst prepared above and 0.7 mmol of triisobutylaluminum.

Thereafter, a mixed gas having the same composition as described above was introduced into the autoclave to initiate polymerization at the total pressure of 8 kg/cm$^2$-G. The temperature in the system immediately rose to 80 ° C.

Then, only the mixed gas was supplied to keep the total pressure at 8 kg/cm$^2$-G, and polymerization was further conducted at 80° C. for 1.5 hours.

After the polymerization was completed, the reaction product was washed with water to remove sodium chloride. Then, the remaining polymer was washed with methanol and dried at 80° C. overnight under a reduced pressure. As a result, an ethylene/1-butene copolymer having MFR, as measured at 190° C. under a load of 2.16 kg, of 1.9 g/10 min, a density of 0.921 g/cm$^3$ and a decane-soluble portion at 23° C. of 0.21% by weight was obtained in an amount of 276 g.

The ethylene/1-butene copolymer was subjected to inflation in the same manner as described in Example 1 to form a film having a thickness of 30 μm.

Melt properties and other properties of the copolymer and physical properties of the film formed from the copolymer are set forth in Table 2.

As is evident from Table 2, an inflation film excellent in moldability (MT), optical characteristics and strength was obtained from the copolymer.

Example 5

Preparation of a Solid Catalyst

The procedure for preparing the solid catalyst in Example 4 was repeated except for varying the amounts of the zirconium compounds to those given below, to prepare a solid catalyst.

Bis(1,3-n-butylmethylcyclopentadienyl)zirconium dichloride: 0.22 mol

Bis(1,3-dimethylcyclopentadienyl)zirconium dichloride: 0.056 mol

In 1 g of the solid catalyst, zirconium was contained in an amount of 3.5 mg.

Polymerization

The procedure for the polymerization in Example 4 was repeated except for varying the composition of the mixed gas consisting of ethylene, 1-butene and hydrogen to that given below.

1-Butene content: 2.4% by mol

Hydrogen content: 0.011% by mol

As a result, an ethylene/1-butene copolymer having MFR of 1.7 g/10 min, a density of 0.924 g/cm$^3$ and a decane-soluble portion at 23° C. of 0.17% by weight was obtained in an amount of 270 g.

The ethylene/1-butene copolymer was subjected to inflation in the same manner as described in Example 1 to form a film having a thickness of 30 μm.

Melt properties and other properties of the copolymer and physical properties of the film formed from the copolymer are set forth in Table 2.

As is evident from Table 2, an inflation film excellent in moldability (MT), optical characteristics and strength was obtained from the above copolymer.

Example 6

Preparation of a Solid Catalyst

The procedure for preparing the solid catalyst in Example 4 was repeated except for varying the amounts of the zirconium compounds to those given below, to prepare a solid catalyst.

Bis(1,3-n-butylmethylcyclopentadienyl)zirconium dichloride: 0.20 mol

Bis(1,3-dimethylcyclopentadienyl)zirconium dichloride: 0.084 mol

In 1 g of the solid catalyst, zirconium was contained in an amount of 3.4 mg.

Polymerization

The procedure for the polymerization in Example 4 was repeated except for varying the composition of the mixed gas consisting of ethylene, 1-butene and hydrogen to that given below.

1-Butene content: 2.5% by mol

Hydrogen content: 0.011% by mol

As a result, an ethylene/1-butene copolymer having MFR of 1.2 g/10 min, a density of 0.923 g/cm$^3$ and a decane-soluble portion at 23° C. of 0.19% by weight was obtained in an amount of 265 g.

The ethylene/1-butene copolymer was subjected to inflation in the same manner as described in Example 1 to form a film having a thickness of 30 μm.

Melt properties and other properties of the copolymer and physical properties of the film formed from the copolymer are set forth in Table 2.

As is evident from Table 2, an inflation film excellent in moldability (MT), optical characteristics and strength was obtained from the above copolymer.

TABLE 2

| | Comonomer | | Catalyst*1 | MFR | | | Density |
|---|---|---|---|---|---|---|---|
| | Kind | Amount mol. % | I/II by mol | g/10-min | [η] dl/g | Mw/Mn | g/cm$^3$ |
| Ex. 4 | 1-butene | 2.8 | 9/1 | 1.9 | 1.81 | 2.1 | 0.921 |
| Ex. 5 | 1-butene | 2.5 | 8/2 | 1.7 | 1.86 | 2.4 | 0.924 |
| Ex. 6 | 1-butene | 2.8 | 7/3 | 1.2 | 1.95 | 2.8 | 0.923 |

| | n-Decane Soluble Portion wt. % | Tm ° C. | MT g | *2 | FI s$^{-1}$ | *3 | MT/(Mw/Mn) | *4 |
|---|---|---|---|---|---|---|---|---|
| Ex. 4 | 0.21 | 109.8 | 2.2 | 1.3 | 115 | 285 | 1.05 | 0 |
| Ex. 5 | 0.17 | 111.3 | 3.3 | 1.4 | 143 | 255 | 1.38 | 0 |
| Ex. 6 | 0.19 | 111.2 | 4.6 | 1.9 | 111 | 180 | 1.64 | 0 |

TABLE 2-continued

| | Physical Properties of Film | | | |
|---|---|---|---|---|
| | Haze % | Gloss % | Impact Strength kg · cm/cm | Moldability *5 |
| Ex. 4 | 3.9 | 106 | 1,910 | BB |
| Ex. 5 | 4.4 | 83 | 1,760 | AA |
| Ex. 6 | 6.6 | 52 | 1,910 | AA |

*1 Zirconium compound in the catalyst component
I: bis(1,3-n-butylmethylcyclopentadienyl)zirconium dichloride
II: bis(1,3-dimethylcyclopentadienyl)zirconium dichloride
*2: value of $2.2 \times \text{MFR}^{-0.84}$
*3: value of $150 \times \text{MFR}$
*4: value of $0.03 \times \text{FI/MFR-3.0}$ (in the case of less than 0, the value is taken as 0)
*5 Moldability
AA: MT ≧ 3 g
BB: 3 g > MT ≧ 2 g
CC: 2 g > MT Example 7

Preparation of a Prepolymerized Catalyst

To 85 liters of hexane containing 1.7 mol of triisobutylaluminum were added 0.85 kg of the solid catalyst obtained in Example 4 and 255 g of 1-hexene. The resultant mixture was subjected to prepolymerization with ethylene at 35° C. for 12 hours to obtain a prepolymerized catalyst in which polyethylene was prepolymerized in an amount of 10 g per 1 g of the solid catalyst. This ethylene polymer had an intrinsic viscosity [T] of 1.74 dl/g.

Polymerization

A 2-liter stainless autoclave thoroughly purged with nitrogen was charged with 150 g of sodium chloride (special grade, available from Wako Junyaku K.K.), followed by drying at 90° C. for 1 hour under a reduced pressure. Then, into the autoclave was introduced a mixed gas consisting of ethylene, 1-butene and hydrogen (1-butene content: 3.0% by mol, hydrogen content: 0.012% by mol) to recover the pressure in the system to atmospheric pressure, and the temperature of the system was set to 70° C.

Subsequently, to the autoclave were added 0.007 mg·atom (in terms of zirconium atom) of the prepolymerized catalyst prepared above and 0.7 mmol of triisobutylaluminum.

Thereafter, the above-mentioned mixed gas consisting of ethylene, 1-butene and hydrogen was introduced into the autoclave to initiate polymerization at the total pressure of 8 kg/cm$^2$-G. The temperature in the system immediately rose to 80° C.

Then, only the mixed gas was supplied to keep the total pressure at 8 kg/cm$^2$-G, and polymerization was further conducted at 80° C. for 1.5 hours.

After the polymerization was completed, the reaction product was washed with water to remove sodium chloride. Then, the remaining polymer was washed with methanol and dried at 80° C. overnight under a reduced pressure. As a result, an ethylene/1-butene copolymer having MFR, as measured at 190° C. under a load of 2.16 kg, of 2.0 g/10 min, a density of 0.922 g/cm$^3$ and a decane-soluble portion at 23° C. of 0.20% by weight was obtained in an amount of 290 g.

Melt properties and other properties of the copolymer are set forth in Table 3.

The ethylene/1-butene copolymer was subjected to inflation in the same manner as described in Example 1 to form a film having a thickness of 30 μm.

Physical properties of the film formed from the copolymer are set forth in Table 3.

As is evident from Table 3, an inflation film excellent in moldability, optical characteristics and strength was obtained from the above copolymer.

Example 8

Preparation of an ethylene/α-olefin copolymer

Preparation of a Catalyst Component

The procedure for preparing the solid catalyst in Example 4 was repeated except for varying the amounts of the transition metal compounds to those given below, to prepare a solid catalyst component.

A toluene solution of bis(1,3-n-butylmethylcyclopentadienyl)zirconium dichloride (Zr: 34.0 mmol/l): 6.6 liters A toluene solution of bis(1,3-dimethylcyclopentadienyl) zirconium dichloride (Zr: 28.1 mmol/l): 2.0 liters Preparation of a Prepolymerized Catalyst The procedure for preparing the prepolymerized catalyst in Example 7 was repeated except for using the solid catalyst component prepared above, to obtain a prepolymerized catalyst.

Polymerization

The procedure for the polymerization in Example 7 was repeated except for using the prepolymerized catalyst prepared above and varying the comonomer content to that set forth in Table 3, to obtain an ethylene/1-butene copolymer different in MFR and density from the copolymer of Example 7.

Melt properties and other properties of the copolymer are set forth in Table 3.

The ethylene/1-butene copolymer was subjected to inflation in the same manner as described in Example 1 to form a film having a thickness of 30 μm.

Physical properties of the film formed from the copolymer are set forth in Table 3.

As is evident from Table 3, an inflation film excellent in moldability, optical characteristics and strength was obtained from the above copolymer.

Example 9

Preparation of an ethylene/α-olefin copolymer

Preparation of a Catalyst Component

The procedure for preparing the solid catalyst in Example 4 was repeated except for varying the amounts of the transition metal compounds to those given below, to prepare a solid catalyst component.

A toluene solution of bis(1,3-n-butylmethylcyclopentadienyl)zirconium dichloride (Zr: 34.0 mmol/l): 5.6 liters A toluene solution of bis(1,3-dimethylcyclopentadienyl) zirconium dichloride (Zr: 28.1 mmol/l): 2.9 liters Preparation of a Prepolymerized Catalyst The procedure for preparing the prepolymerized catalyst in Example 7 was repeated except for using the solid catalyst component prepared above, to obtain a prepolymerized catalyst.

Polymerization

The procedure for the polymerization in Example 7 was repeated except for using the prepolymerized catalyst prepared above and varying the comonomer content to that set forth in Table 3, to obtain an ethylene/1-butene copolymer different in MFR and density from the copolymer of Example 7.

Melt properties and other properties of the copolymer are set forth in Table 3.

The ethylene/1-butene copolymer was subjected to inflation in the same manner as described in Example 1 to form a film having a thickness of 30 μm.

Physical properties of the film formed from the copolymer are set forth in Table 3.

As is evident from Table 3, an inflation film excellent in moldability, optical characteristics and strength was obtained from the above copolymer.

Example 10

The procedure of Example 8 was repeated except for using 1-hexene as a comonomer in place of 1-butene, to obtain an ethylene/1-hexene copolymer.

Melt properties and other properties of the copolymer are set forth in Table 3.

The ethylene/1-hexene copolymer was subjected to inflation in the same manner as described in Example 1 to form a film having a thickness of 30 μm.

Physical properties of the film formed from the copolymer are set forth in Table 3.

As is evident from Table 3, an inflation film excellent in moldability, optical characteristics and strength was obtained from the above copolymer.

Comparative Example 1

The procedure of Example 7 was repeated except for using bis(1,3-n-butylmethylcyclopentadienyl)zirconium dichloride singly as the transition metal compound catalyst component and varying the comonomer content to that set forth in Table 3, to prepare an ethylene/1-butene copolymer.

Melt properties and other properties of the copolymer are set forth in Table 3.

The ethylene/1-butene copolymer was subjected to inflation in the same manner as described in Example 1 to form a film having a thickness of 30 μm.

Physical properties of the film formed from the copolymer are set forth in Table 3.

Comparative Example 2

The procedure of Example 7 was repeated except for using bis(1,3-dimethylcyclopentadienyl)zirconium dichloride singly as the transition metal compound catalyst component and varying the comonomer content to that set forth in Table 3, to prepare an ethylene/1-butene copolymer.

Melt properties and other properties of the copolymer are set forth in Table 3.

The ethylene/1-butene copolymer was subjected to inflation in the same manner as described in Example 1 to form a film having a thickness of 30 μm.

Physical properties of the film formed from the copolymer are set forth in Table 3.

Comparative Example 3

The procedure of Example 7 was repeated except for using bis(1,3-dimethylcyclopentadienyl)zirconium dichloride singly as the transition metal compound catalyst component and varying the comonomer content to that set forth in Table 3, to prepare an ethylene/1-butene copolymer.

Melt properties and other properties of the copolymer are set forth in Table 3.

The ethylene/1-butene copolymer was subjected to inflation in the same manner as described in Example 1 to form a film having a thickness of 30 μm.

Physical properties of the film formed from the copolymer are set forth in Table 3.

Comparative Example 4

The procedure of Comparative Example 3 was repeated except for using 1-hexene as a comonomer in place of 1-butene, to obtain an ethylene/1-hexene copolymer.

Melt properties and other properties of the copolymer are set forth in Table 3.

The ethylene/1-hexene copolymer was subjected to inflation in the same manner as described in Example 1 to form a film having a thickness of 30 μm.

Physical properties of the film formed from the copolymer are set forth in Table 3.

As is evident from comparison between the copolymer obtained in Example 7 and the copolymer obtained in Comparative Example 1, the copolymer of Example 7 is superior to the copolymer of Comparative Example 1 in the moldability (MT), although the MFR of the copolymer of Example 7 is higher than that of the copolymer of Comparative Example 1.

Further, when the copolymer obtained in Example 8 and the copolymer obtained in Comparative Example 2, both having the same MFR, are compared with each other, the copolymer of Example 8 is superior to the copolymer of Comparative Example 2 in the moldability (MT). Likewise, when the copolymer obtained in Example 9 and the copolymer obtained in Comparative Example 3, both having almost the same MFR, are compared with each other, the copolymer of Example 9 is superior to the copolymer of Comparative Example 3 in the moldability (MT).

Figure 4:
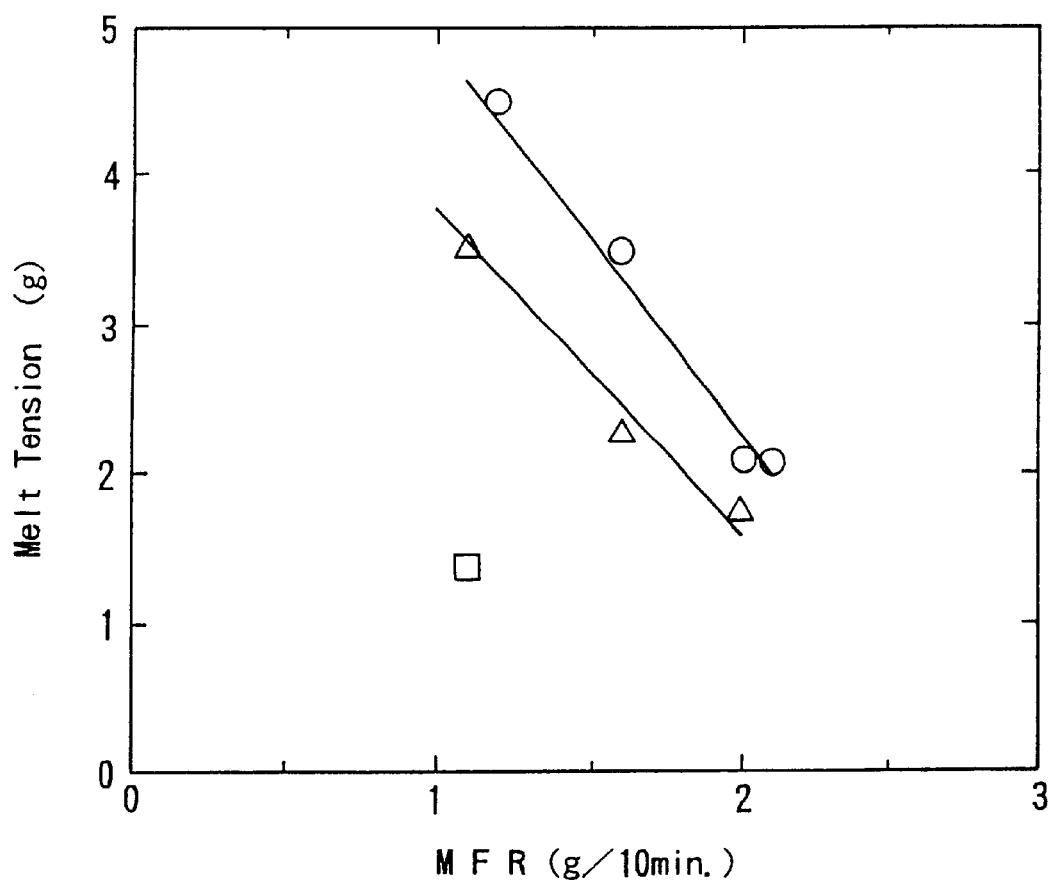
FIG. 4 is a diagram showing a relationship between a melt flow rate (MFR) and a melt tension (MT) of the ethylene/α-olefin copolymer according to the present invention and a relationship between MFR and MT of a conventionally known ethylene/α-olefin copolymer.

FIG. 4 shows a relationship between MFR and MT of the ethylene/α-olefin copolymer of the present invention and a relationship between MFR and MT of a conventional ethylene/α-olefin copolymer.

When the film formed from the copolymer obtained in Example 8 is compared in the haze with the films formed from the copolymers obtained in Comparative Examples 1, 2 and 3, said all copolymers being almost the same as each other in the MFR and the density, the film of Example 8 is superior to other films in the transparency.

Further, when the film formed from the copolymer obtained in Example 10 is compared in the haze with the film obtained in Comparative Example 4, both copolymers being almost the same as each other in the MFR, the film of Example 10 is superior to the film of Comparative Example 4 in the transparency, although the copolymer of Example 10 has a density little higher than that of the copolymer of Comparative Example 4.

In the catalysts used in Examples 7 to 10, both the transition metal compound catalyst component contained in the catalyst component used in Comparative Example 1 and the transition metal compound catalyst component contained in the catalyst component used in Comparative Examples 2 to 4 were contained. As is evident from the fact, the ethylene/α-olefin copolymer prepared by using both of the transition metal compound catalyst components was more improved in the moldability (MT) and the transparency of an inflation film formed therefrom than the copolymer prepared by using each transition metal compound catalyst component singly.

TABLE 3

| Comonomer | | Catalyst*1 | MFR | | | |
|---|---|---|---|---|---|---|
| Kind | Amount mol. % | I/II by mol | g/10- min | [η] dl/g | Mw/Mn | Density g/cm³ |
| Ex. 7 | 1-butene | 3.0 | 9/1 | 2.0 | 1.79 | 2.1 | 0.922 |
| Ex. 8 | 1-butene | 2.5 | 8/2 | 1.6 | 1.88 | 2.4 | 0.925 |

TABLE 3-continued

| | | | | | | | |
|---|---|---|---|---|---|---|---|
| Ex. 9 | 1-butene | 2.8 | 7/3 | 1.2 | 1.95 | 2.8 | 0.922 |
| Ex. 10 | 1-hexene | 2.9 | 8/2 | 2.1 | 1.64 | 2.6 | 0.923 |
| Comp. Ex. 1 | 1-butene | 2.4 | 10/0 | 1.1 | 2.07 | 2.0 | 0.925 |
| Comp. Ex. 2 | 1-butene | 2.5 | 0/10 | 1.6 | 1.49 | 2.8 | 0.925 |
| Comp. Ex. 3 | 1-butene | 2.4 | 0/10 | 1.1 | 1.58 | 2.7 | 0.926 |
| Comp. Ex. 4 | 1-hexene | 3.0 | 0/10 | 2.0 | 1.44 | 2.9 | 0.920 |

| | n-Decane Soluble Portion wt. % | Tm °C. | MT g | FI s$^{-1}$ | | $\frac{MT}{(Mw/Mn)}$ | |
|---|---|---|---|---|---|---|---|
| | | | | | *2 | | *3 | *4 |
| Ex. 7 | 0.20 | 111.0 | 2.1 | 1.2 | 123 | 300 | 1.00 | 0 |
| Ex. 8 | — | 111.4 | 3.5 | 1.5 | 84 | 240 | 1.46 | 0 |
| Ex. 9 | — | 111.1 | 4.5 | 1.9 | 94 | 180 | 1.61 | 0 |
| Ex. 10 | — | 114.5 | 2.1 | 1.2 | 212 | 315 | 0.81 | 0.03 |
| Comp. Ex. 1 | — | 111.4 | 1.4 | 2.0 | 62 | 165 | 0.70 | 0 |
| Comp. Ex. 2 | — | 111.4 | 2.3 | 1.5 | 300 | 240 | 0.82 | 2.63 |
| Comp. Ex. 3 | 0.57 | 111.5 | 3.5 | 2.0 | 190 | 165 | 1.30 | 2.18 |
| Comp. Ex. 4 | 0.47 | 112.2 | 1.8 | 1.2 | 290 | 300 | 0.62 | 1.35 |

| | Physical Properties of Film | | | |
|---|---|---|---|---|
| | Haze % | Gloss % | Impact Strength kg·cm/cm | Moldability *5 |
| Ex. 7 | 4.2 | 105 | 1,850 | BB |
| Ex. 8 | 4.6 | 82 | 1,720 | AA |
| Ex. 9 | 6.5 | 55 | 1,940 | AA |
| Ex. 10 | 5.6 | 88 | 2,270 | BB |
| Comp. Ex. 1 | 12.4 | 37 | 1,840 | CC |
| Comp. Ex. 2 | 7.0 | 66 | 1,620 | BB |
| Comp. Ex. 3 | 7.2 | 63 | 1,720 | AA |
| Comp. Ex. 4 | 9.5 | 49 | 3,540 | CC |

*1 Transition metal compound catalyst component
I: bis(1,3-n-butylmethylcyclopentadienyl)zirconium dichloride
II: bis(1,3-dimethylcyclopentadienyl)zirconium dichloride
*2: value of $2.2 \times MFR^{-0.84}$
*3: value of $150 \times MFR$
*4: value of $0.03 \times FI/MFR - 3.0$ (in the case of less than 0, the value is taken as 0)
*5 Moldability
AA: MT ≧ 3 g
BB: 3 g > MT ≧ 2 g
CC: 2 g > MT

Preparation Example 1

Polymerization

In a fluidized bed gas phase polymerizer of continuous type, ethylene was copolymerized with 1-hexene at the total pressure of 20 kg/cm²-G and a polymerization temperature of 80° C. To the polymerizer were continuously fed the prepolymerized catalyst prepared in Example 7 at a feed rate of 0.18 mmol/hr in terms of zirconium atom and triisobutylaluminum at a feed rate of 10 mmol/hr while continuously feeding ethylene, 1-hexene, hydrogen and nitrogen to maintain a constant gas composition (gas composition: 1-hexene/ethylene=0.030, hydrogen/ethylene=5.5×10⁻⁴, ethylene concentration=25%) during the polymerization.

Thus, an ethylene/1-hexene copolymer (A-1) was obtained in an amount of 6.0 kg/hr. The copolymer had MFR of 2.1 g/10 min and a density of 0.923 g/cm³. Physical properties of the ethylene/1-hexene copolymer (A-1) are set forth in Table 4.

Example 11

825g of the ethylene/α-olefin copolymer (ethylene/1-hexene copolymer obtained in Preparation Example 1, density: 0.923 g/cm³, MFR: 2.1 g/10 min) was dissolved at 160° C. in 5.7 liters of toluene as a reaction solvent.

Then, to the resultant solution were slowly added a toluene solution of maleic anhydride (4.13 g/250 ml) and a toluene solution of dicumyl peroxide (DCP) (0.33 g/50 ml) over a period of 4 hours through different conduits.

After the addition was completed, the reaction was further continued for 30 minutes at 160° C. Then, the temperature of the system was cooled to room temperature to precipitate a polymer. The precipitated polymer was filtered, then repeatedly washed with acetone and dried at 80° C. for one day and night under a reduced pressure, to obtain an aimed modified ethylene/α-olefin copolymer.

The modified ethylene/α-olefin copolymer was subjected to elemental analysis to determine the graft amount of the maleic anhydride. As a result, in the modified ethylene/α-olefin copolymer, maleic anhydride was graft polymerized in an amount of 0.2 g per 100 g of the modified ethylene/α-olefin copolymer. Further, the modified copolymer had a density of 0.923 g/cm³ and MFR of 1.0 g/10 min.

The modified ethylene/α-olefin copolymer was measured on the physical properties such as melt properties. The results are set forth in Table 5.

Molding of a Pressed Sheet

The modified ethylene/α-olefin copolymer was heated at 200° C. for 10 minutes by a press molding machine. Then, the copolymer was held under a pressure of 100 kg/cm² for 3 minutes and was further held under a pressure of 100 kg/cm² for 5 minutes using a cooled pressing machine of 20° C. to mold the copolymer into a pressed sheet.

The pressed sheet was measured on various properties such as transparency and adhesion strength to an aluminum foil or to a 6-nylon sheet. The results are set forth in Table 5.

As is evident from the results set forth in Table 5, the modified ethylene/α-olefin copolymer has a good transparency and shows a high moldability owing to high melt tension. Further, the copolymer is excellent in the adhesion strength to highly polar materials such as aluminum and nylon.

TABLE 4

| Copolymer | Comonomer | Comonomer Content mol. % | MFR g/10 min | [η] dl/g | Mw/Mn | Density g/cm³ | Decane-Soluble Portion wt. % |
|---|---|---|---|---|---|---|---|
| A-1 | 1-hexene | 2.9 | 2.1 | 1.64 | 2.6 | 0.923 | 0.26 |

| Copolymer | Tm °C. | MT g | *1 | FI s$^{-1}$ | *2 | $\frac{MT}{(Mw/Mn)}$ | *3 |
|---|---|---|---|---|---|---|---|
| A-1 | 114.5 | 2.1 | 1.2 | 212 | 315 | 0.81 | 0.03 |

*1: value of $2.2 \times MFR^{-0.84}$
*2: value of $150 \times MFR$
*3: value of $0.03 \times FI/MFR - 3.0$ (in the case of less than 0, the value is taken as 0)

TABLE 5

| | Modified Ethylene/α-olefin Copolymer | | | | | Adhesion to Adherend | |
|---|---|---|---|---|---|---|---|
| | MFR g/10 min | Density g/cm³ | MT g | FI s⁻¹ | Haze % | to Aluminum kg/25 mm | to 6-Nylon kg/25 mm |
| Ex. 11 | 1.0 | 0.923 | 4.7 | 115 | 50 | 18.9 | 26.3 |

What is claimed is:

1. A graft modified ethylene/α-olefin copolymer obtained by graft copolymerizing an ethylene/α-olefin copolymer with a polar monomer, wherein the ethylene/α-olefin copolymer is a copolymer obtained by copolymerizing ethylene with an α-olefin of 4 to 8 carbon atoms in the presence of a catalyst for olefin polymerization comprising (a) an organoaluminum oxy-compound and (b) at least two kinds of compounds of Group IV transition metals of the periodic table containing a ligand having a cyclopentadienyl skeleton which are supported on a carrier, wherein the ethylene/α-olefin copolymer has such properties that:

(i) the density is in the range of 0.880 to 0.960 g/cm³, (ii) the melt flow rate (MFR) at 190° C. under a load of 2.16 kg is in the range of 0.05 to 50 g/10 min, (iii) the melt tension (MT (g)) at 190° C. and the melt flow rate (MFR) satisfy the relation
MT>2.2×MFR$^{-0.84}$, and (iv) the flow index (FI (1/sec)) defined by a shear rate which is given when a shear stress of molten copolymer at 190° C. reaches 2.4×10⁶ dyne/cm² and the melt flow rate (MFR) satisfy the relation
FI<150×MFR.

2. An ethylene copolymer composition comprising:

(A) the graft modified ethylene/α-olefin copolymer of claim 1 obtained by graft copolymerizing an ethylene/α-olefin copolymer with a polar monomer, said ethylene/α-olefin copolymer being a copolymer obtained by copolymerizing ethylene with an α-olefin of 4 to 8 carbon atoms in the presence of a catalyst for olefin polymerization comprising (a) an organoaluminum oxy-compound and (b) at least two compounds of Group IV transition metal of the periodic table containing a ligand having a cyclopentadienyl skeleton, and said ethylene/α-olefin copolymer having such properties that:

(i) the density is in the range of 0.880 to 0.960 g/cm³, and (ii) the melt flow rate (MFR) at 190° C. under a load of 2.16 kg is in the range of 0.05 to 50 g/10 min; and (B) polyolefin;

wherein a weight ratio (A):(B) between the graft modified ethylene/α-olefin copolymer (A) and the polyolefin (B) is in the range of 2:98 to 98:2.

3. The graft modified ethylene/α-olefin copolymer as claimed in claim 1, wherein said at least two kinds of compounds (b) of Group IV transition metals of the periodic table containing a ligand having a cyclopentadienyl skeleton are:

at least one kind of a transition metal compound represented by the following formula (I):

$$ML^1_x \quad \text{(I)}$$

wherein M is a transition metal atom selected from Group IVB of the periodic table, $L^1$ is a ligand coordinating to the transition metal atom M, at least two of $L^1$ are groups selected from a substituted cyclopentadienyl group having at least one substituent group selected from a hydrocarbon group of 3 to 10 carbon atoms, $L^1$ other than the substituted cyclopentadienyl group is a hydrocarbon group of 1 to 12 carbon atoms, an alkoxy group, an aryloxy group, a trialkylsilyl group, a halogen atom or a hydrogen atom, and X is a valence of the transition metal atom M, and at least one kind of a transition metal compound represented by the following formula (II):

$$ML^2_x \quad \text{(II)}$$

wherein M is a transition metal atom selected from Group IVB of the periodic table, $L^2$ is a ligand coordinating to the transition metal atom, at least two of $L^2$ are substituted cyclopentadienyl groups having 2–5 substituent groups selected from a methyl group and an ethyl group, $L^2$ other than the substituted cyclopentadienyl group is a hydrocarbon group of 1 to 12 carbon atoms, an alkoxy group, an aryloxy group, a trialkylsilyl group, a halogen atom or a hydrogen atom, and X is a valence of the transition metal atom M.

4. A graft modified ethylene/α-olefin copolymer obtained by graft copolymerizing an ethylene/α-olefin copolymer with a polar monomer, wherein the ethylene/α-olefin copolymer is obtained by copolymerizing ethylene with an α-olefin of 4 to 8 carbon atoms and wherein the ethylene α-olefin copolymer has such properties that:

(i) the density is in the range of 0.880 to 0.960 g/cm³, (ii) the melt flow rate (MFR) at 190° C. under a load of 2.16 kg is in the range of 0.05 to 50 g/10 min, (iii) the melt tension (MT (g)) at 190° C. and the melt flow rate (MFR) satisfy the relation
MT>2.2×MFR$^{-0.84}$, (iv) the flow index (FI (1/sec)) defined by a shear rate which is given when a shear stress of molten copolymer at 190° C. reaches 2.4×10⁶dyne/cm² and the melt flow rate (MFR) satisfy the relation
FI<150×MFR, (v) the molecular weight distribution (Mw/Mn) measured by GPC is in the range of 1.5 to 4, and (vi) MT/(Mw/Mn) and FI/MFR satisfy the relation
MT/(Mw/Mn)>0.03×FI/MFR−3.0 with the proviso that when the value of 0.03×FI/MFR−3.0 is less than 0, it is taken as 0.

5. A graft modified ethylene/α-olefin copolymer obtained by copolymerizing an ethylene/α-olefin copolymer with a polar monomer, wherein the ethylene/α-olefin copolymer is a copolymer obtained by copolymerizing ethylene with an α-olefin of 4 to 8 carbon atoms in the presence of a catalyst for olefin polymerization comprising (a) an organoaluminum oxy-compound and (b) a combination of at least two kinds of compounds of Group IV transition metals of the periodic table containing a ligand having a cyclopentadienyl skeleton which are supported on a carrier, wherein the ethylene/α-olefin copolymer has such properties that:

(i) the density is in the range of 0.880 to 0.960 g/cm³, (ii) the melt flow rate (MFR) at 190° C. under a load of 2.16 kg is in the range of 0.05 to 50 g/10 min, (iii) the melt tension (MT (g)) at 190° C. and the melt flow rate (MFR) satisfy the relation
MT>2.2×MFR$^{-0.84}$, and (iv) the flow index (FI (l/sec)) defined by a shear rate which is given when a shear stress of molten copolymer at 190° C. reaches $2.4 \times 10^6$ dyne/cm$^2$ and the melt flow rate (MFR) satisfy the relation
FI<150×MFR, wherein the combination of at least two kinds of compounds (b) are selected from the combinations of
  a combination of bis(1,3-n-butylmethylcyclopentadienyl) zirconium dichloride and bis(1,3-dimethylcyclopentadienyl) zirconium dichloride,
  a combination of bis(1,3-n-propylmethylcyclopentadienyl) zirconium dichloride and bis(1,3-dimethylcyclopentadienyl) zirconium dichloride, and
  a combination of bis(n-butylcyclopentadienyl) zirconium dichloride and bis(1,3-dimethylcyclopentadienyl)zirconium dichloride.

6. The graft modified ethylene/α-olefin copolymer as claimed in claim 5, wherein said combination of at least two kinds of compounds (b) is
  a combination of bis(1,3-n-butylmethylcyclopentadienyl) zirconium dichloride and bis(1,3-dimethylcyclopentadienyl) zirconium dichloride.

7. A graft modified ethylene/α-olefin copolymer obtained by copolymerizing an ethylene/α-olefin copolymer with a polar monomer, wherein the ethylene/α-olefin copolymer is a copolymer obtained by copolymerizing ethylene with an α-olefin of 4 to 8 carbon atoms in the presence of a catalyst for olefin polymerization comprising (a) an organoaluminum oxycompound and (b) a combination of at least two kinds of compounds of Group IV transition metals of the periodic table containing a ligand having a cyclopentadienyl skeleton which are supported on a carrier, wherein the ethylene/α-olefin copolymer has such properties that:

(i) the density is in the range of 0.880 to 0.960 g/cm$^3$,
  (ii) the melt flow rate (MFR) at 190° C. under a load of 2.16 kg is in the range of 0.05 to 50 g/10 min,
  (iii) the melt tension (MT (g)) at 190° C. and the melt flow rate (MFR) satisfy the relation
    MT>2.2×MFR$^{-0.84}$, and
  (iv) the flow index (FI (l/sec)) defined by a shear rate which is given when a shear stress of molten copolymer at 190° C. reaches $2.4 \times 10^6$ dyne/cm$^2$ and the melt flow rate (MFR) satisfy the relation
    FI<150×MFR,
  (v) the molecular weight distribution (Mw/Mn) measured by GPC is in the range of 1.5 to 4, and (vi) MT/(Mw/Mn) and FI/MFR satisfy the relation
    MT/(Mw/Mn)>0.03×FI/MFR−3.0
    with the proviso that when the value of 0.03×FI/MFR−3.0 is less than 0, it is taken as 0, wherein the combination of at least two kinds of compounds (b) are selected from the combination of
  a combination of bis(1,3-n-butylmethylcyclopentadienyl) zirconium dichloride and bis(1,3-dimethylcyclopentadienyl) zirconium dichloride,
  a combination of bis(1,3-n-propylmethylcyclopentadienyl) zirconium dichloride and bis(1,3-dimethylcyclopentadienyl) zirconium dichloride, and
  a combination of bis(n-butylcyclopentadienyl) zirconium dichloride and bis(1,3-dimethylcyclopentadienyl)zirconium dichloride.

8. The graft modified ethylene/α-olefin copolymer as claimed in claim 7, wherein said combination of at least two kinds of compounds (b) is
  a combination of bis(1,3-n-butylmethylcyclopentadienyl) zirconium dichloride and bis(1,3-dimethylcyclopentadienyl) zirconium dichloride.

9. An ethylene copolymer composition comprising:
(A) the graft modified ethylene/α-olefin copolymer of claim 4 obtained by graft copolymerizing an ethylene/α-olefin copolymer with a polar monomer, said ethylene/α-olefin copolymer being a copolymer obtained by copolymerizing ethylene with an α-olefin of 4 to 8 carbon atoms in the presence of a catalyst for olefin polymerization comprising (a) an organoaluminum oxy-compound and (b) at least two compounds of Group IV transition metal of the periodic table containing a ligand having a cyclopentadienyl skeleton, and said ethylene/α-olefin copolymer having such properties that:
  (i) the density is in the range of 0.880 to 0.960 g/cm$^3$, and
  (ii) the melt flow rate (MFR) at 190° C. under a load of 2.16 kg is in the range of 0.05 to 50 g/10 min; and
(B) polyolefin;
wherein a weight ratio (A):(B) between the graft modified ethylene/α-olefin copolymer (A) and the polyolefin (B) is in the range of 2:98 to 98:2.

\* \* \* \* \*